US00RE45291E

(19) United States
(12) Reissued Patent
Nathan et al.

(10) Patent Number: US RE45,291 E
(45) Date of Reissued Patent: Dec. 16, 2014

(54) VOLTAGE-PROGRAMMING SCHEME FOR CURRENT-DRIVEN AMOLED DISPLAYS

(71) Applicant: Ignis Innovation Inc., Waterloo (CA)

(72) Inventors: Arokia Nathan, Cambridge (GB); Richard I-Heng Huang, Waterloo (CA); Stefan Alexander, Elmira (CA)

(73) Assignee: Ignis Innovation Inc., Waterloo (CA)

(21) Appl. No.: 14/090,320

(22) Filed: Nov. 26, 2013

Related U.S. Patent Documents

Reissue of:
(64) Patent No.: 8,232,939
Issued: Jul. 31, 2012
Appl. No.: 13/396,375
Filed: Feb. 14, 2012

U.S. Applications:
(63) Continuation of application No. 11/571,480, filed as application No. PCT/CA2005/001007 on Jun. 28, 2005, now Pat. No. 8,115,707.

(30) Foreign Application Priority Data

Jun. 29, 2004 (CA) ..... 2472671

(51) Int. Cl.
*G09G 3/30* (2006.01)

(52) U.S. Cl.
USPC ..... 345/78; 345/76; 345/214; 345/600; 315/169.3

(58) Field of Classification Search
USPC ..... 345/76–83, 204–214, 600–605, 345/690–699, 169.3
See application file for complete search history.

(56) References Cited

U.S. PATENT DOCUMENTS

| | | | |
|---|---|---|---|
| 3,506,851 | A | 4/1970 | Polkinghorn et al. |
| 3,774,055 | A | 11/1973 | Bapat et al. |
| 4,090,096 | A | 5/1978 | Nagami |
| 4,160,934 | A | 7/1979 | Kirsch |
| 4,354,162 | A | 10/1982 | Wright |
| 4,758,831 | A | 7/1988 | Kasahara et al. |
| 4,943,956 | A | 7/1990 | Noro |

(Continued)

FOREIGN PATENT DOCUMENTS

| | | |
|---|---|---|
| CA | 1 294 034 | 1/1992 |
| CA | 2 109 951 | 11/1992 |

(Continued)

OTHER PUBLICATIONS

Ahnood et al.: "Effect of threshold voltage instability on field effect mobility in thin film transistors deduced from constant current measurements"; dated Aug. 2009 (3 pages).

(Continued)

*Primary Examiner* — Dmitriy Bolotin
(74) *Attorney, Agent, or Firm* — Nixon Peabody LLP

(57) ABSTRACT

A system and method for driving an AMOLED display is provided. The AMOLED display includes a plurality of pixel circuits. A voltage-programming scheme, a current-programming scheme or a combination thereof is applied to drive the display. Threshold shift information, and/or voltage necessary to obtain hybrid driving circuit may be acquired. A data sampling may be implemented to acquire a current/voltage relationship. A feedback operation may be implemented to correct the brightness of the pixel.

70 Claims, 23 Drawing Sheets

(56) References Cited

U.S. PATENT DOCUMENTS 4,963,860 A 10/1990 Stewart
4,975,691 A 12/1990 Lee
4,996,523 A 2/1991 Bell et al.
5,051,739 A 9/1991 Hayashida et al.
5,153,420 A 10/1992 Hack et al.
5,198,803 A 3/1993 Shie et al.
5,204,661 A 4/1993 Hack et al.
5,222,082 A 6/1993 Plus
5,266,515 A 11/1993 Robb et al.
5,489,918 A 2/1996 Mosier
5,498,880 A 3/1996 Lee et al.
5,572,444 A 11/1996 Lentz et al.
5,589,847 A 12/1996 Lewis
5,619,033 A 4/1997 Weisfield
5,648,276 A 7/1997 Hara et al.
5,670,973 A 9/1997 Bassetti et al.
5,686,935 A 11/1997 Weisbrod
5,691,783 A 11/1997 Numao et al.
5,712,653 A 1/1998 Katoh et al.
5,714,968 A 2/1998 Ikeda
5,723,950 A 3/1998 Wei et al.
5,744,824 A 4/1998 Kousai et al.
5,745,660 A 4/1998 Kolpatzik et al.
5,747,928 A 5/1998 Shanks et al.
5,748,160 A 5/1998 Shieh et al.
5,784,042 A 7/1998 Ono et al.
5,790,234 A 8/1998 Matsuyama
5,815,303 A 9/1998 Berlin
5,870,071 A 2/1999 Kawahata
5,874,803 A 2/1999 Garbuzov et al.
5,880,582 A 3/1999 Sawada
5,903,248 A 5/1999 Irwin
5,917,280 A 6/1999 Burrows et al.
5,923,794 A 7/1999 McGrath et al.
5,945,972 A 8/1999 Okumura et al.
5,949,398 A 9/1999 Kim
5,952,789 A 9/1999 Stewart et al.
5,952,991 A 9/1999 Akiyama et al.
5,982,104 A 11/1999 Sasaki et al.
5,990,629 A 11/1999 Yamada et al.
6,023,259 A 2/2000 Howard et al.
6,069,365 A 5/2000 Chow et al.
6,081,131 A 6/2000 Ishii
6,091,203 A 7/2000 Kawashima et al.
6,097,360 A 8/2000 Holloman
6,144,222 A 11/2000 Ho
6,157,583 A 12/2000 Starnes et al.
6,166,489 A 12/2000 Thompson et al.
6,177,915 B1 1/2001 Beeteson et al.
6,225,846 B1 5/2001 Wada et al.
6,229,506 B1 5/2001 Dawson et al.
6,229,508 B1 5/2001 Kane
6,232,939 B1 5/2001 Saito et al.
6,246,180 B1 6/2001 Nishigaki
6,252,248 B1 6/2001 Sano et al.
6,259,424 B1 7/2001 Kurogane
6,262,589 B1 7/2001 Tamukai
6,271,825 B1 8/2001 Greene et al.
6,274,887 B1 8/2001 Yamazaki et al.
6,288,696 B1 9/2001 Holloman
6,300,928 B1 10/2001 Kim
6,303,963 B1 10/2001 Ohtani et al.
6,304,039 B1 10/2001 Appelberg et al.
6,306,694 B1 10/2001 Yamazaki et al.
6,307,322 B1 10/2001 Dawson et al.
6,310,962 B1 10/2001 Chung et al.
6,316,786 B1 11/2001 Mueller et al.
6,320,325 B1 11/2001 Cok et al.
6,323,631 B1 11/2001 Juang
6,323,832 B1 11/2001 Nishizawa et al.
6,345,085 B1 2/2002 Yeo et al.
6,348,835 B1 2/2002 Sato et al.
6,356,029 B1 3/2002 Hunter
6,365,917 B1 4/2002 Yamazaki
6,373,453 B1 4/2002 Yudasaka
6,373,454 B1 4/2002 Knapp et al.
6,384,427 B1 5/2002 Yamazaki et al.
6,392,617 B1 * 5/2002 Gleason ..... 345/82
6,399,988 B1 6/2002 Yamazaki
6,414,661 B1 7/2002 Shen et al.
6,417,825 B1 7/2002 Stewart et al.
6,420,758 B1 7/2002 Nakajima
6,420,834 B2 7/2002 Yamazaki et al.
6,420,988 B1 7/2002 Azami et al.
6,433,488 B1 8/2002 Bu
6,437,106 B1 8/2002 Stoner et al.
6,445,369 B1 9/2002 Yang et al.
6,445,376 B2 9/2002 Parrish
6,468,638 B2 10/2002 Jacobsen et al.
6,475,845 B2 11/2002 Kimura
6,489,952 B1 12/2002 Tanaka et al.
6,501,098 B2 12/2002 Yamazaki
6,501,466 B1 12/2002 Yamagishi et al.
6,512,271 B1 1/2003 Yamazaki et al.
6,518,594 B1 2/2003 Nakajima et al.
6,522,315 B2 2/2003 Ozawa et al.
6,524,895 B2 2/2003 Yamazaki et al.
6,525,683 B1 2/2003 Gu
6,531,713 B1 3/2003 Yamazaki
6,531,827 B2 3/2003 Kawashima
6,542,138 B1 4/2003 Shannon et al.
6,559,594 B2 5/2003 Fukunaga et al.
6,573,195 B1 6/2003 Yamazaki et al.
6,573,584 B1 6/2003 Nagakari et al.
6,576,926 B1 6/2003 Yamazaki et al.
6,580,408 B1 6/2003 Bae et al.
6,580,657 B2 6/2003 Sanford et al.
6,583,398 B2 6/2003 Harkin
6,583,775 B1 6/2003 Sekiya et al.
6,583,776 B2 6/2003 Yamazaki et al.
6,587,086 B1 7/2003 Koyama
6,593,691 B2 7/2003 Nishi et al.
6,594,606 B2 7/2003 Everitt
6,597,203 B2 7/2003 Forbes
6,611,108 B2 8/2003 Kimura
6,617,644 B1 9/2003 Yamazaki et al.
6,618,030 B2 9/2003 Kane et al.
6,639,244 B1 10/2003 Yamazaki et al.
6,641,933 B1 11/2003 Yamazaki et al.
6,661,180 B2 12/2003 Koyama
6,661,397 B2 12/2003 Mikami et al.
6,668,645 B1 12/2003 Gilmour et al.
6,670,637 B2 12/2003 Yamazaki et al.
6,677,713 B1 1/2004 Sung
6,680,577 B1 1/2004 Inukai et al.
6,680,580 B1 1/2004 Sung
6,687,266 B1 2/2004 Ma et al.
6,690,000 B1 2/2004 Muramatsu et al.
6,690,344 B1 2/2004 Takeuchi et al.
6,693,388 B2 2/2004 Oomura
6,693,610 B2 2/2004 Shannon et al.
6,697,057 B2 2/2004 Koyama et al.
6,720,942 B2 4/2004 Lee et al.
6,724,151 B2 4/2004 Yoo
6,734,636 B2 5/2004 Sanford et al.
6,738,034 B2 5/2004 Kaneko et al.
6,738,035 B1 5/2004 Fan
6,753,655 B2 6/2004 Shih et al.
6,753,834 B2 6/2004 Mikami et al.
6,756,741 B2 6/2004 Li
6,756,952 B1 6/2004 Decaux et al.
6,756,985 B1 6/2004 Hirotsune et al.
6,771,028 B1 8/2004 Winters
6,777,712 B2 8/2004 Sanford et al.
6,777,888 B2 8/2004 Kondo
6,780,687 B2 8/2004 Nakajima et al.
6,781,567 B2 8/2004 Kimura
6,806,497 B2 10/2004 Jo
6,806,638 B2 10/2004 Lih et al.
6,806,857 B2 10/2004 Sempel et al.
6,809,706 B2 10/2004 Shimoda
6,815,975 B2 11/2004 Nara et al.
6,828,950 B2 12/2004 Koyama
6,853,371 B2 2/2005 Miyajima et al.

(56) References Cited

U.S. PATENT DOCUMENTS 6,859,193 B1 2/2005 Yumoto
6,861,670 B1 3/2005 Ohtani et al.
6,873,117 B2 3/2005 Ishizuka
6,873,320 B2 3/2005 Nakamura
6,876,346 B2 4/2005 Anzai et al.
6,878,968 B1 4/2005 Ohnuma
6,885,356 B2 4/2005 Hashimoto
6,900,485 B2 5/2005 Lee
6,903,734 B2 6/2005 Eu
6,909,114 B1 6/2005 Yamazaki
6,909,243 B2 6/2005 Inukai
6,909,419 B2 6/2005 Zavracky et al.
6,911,960 B1 6/2005 Yokoyama
6,911,964 B2 6/2005 Lee et al.
6,914,448 B2 7/2005 Jinno
6,919,871 B2 7/2005 Kwon
6,924,602 B2 8/2005 Komiya
6,937,215 B2 8/2005 Lo
6,937,220 B2 8/2005 Kitaura et al.
6,940,214 B1 9/2005 Komiya et al.
6,943,500 B2 9/2005 LeChevalier
6,947,022 B2 9/2005 McCartney
6,954,194 B2 10/2005 Matsumoto et al.
6,956,547 B2 * 10/2005 Bae et al. ..... 345/77
6,975,142 B2 12/2005 Azami et al.
6,975,332 B2 12/2005 Arnold et al.
6,995,510 B2 2/2006 Murakami et al.
6,995,519 B2 2/2006 Arnold et al.
7,022,556 B1 4/2006 Adachi
7,023,408 B2 4/2006 Chen et al.
7,027,015 B2 4/2006 Booth, Jr. et al.
7,027,078 B2 4/2006 Reihl
7,034,793 B2 4/2006 Sekiya et al.
7,038,392 B2 5/2006 Libsch et al.
7,057,359 B2 6/2006 Hung et al.
7,061,451 B2 6/2006 Kimura
7,064,733 B2 6/2006 Cok et al.
7,071,932 B2 7/2006 Libsch et al.
7,088,051 B1 * 8/2006 Cok ..... 315/169.1
7,088,052 B2 8/2006 Kimura
7,102,378 B2 9/2006 Kuo et al.
7,106,285 B2 9/2006 Naugler
7,112,820 B2 9/2006 Chang et al.
7,116,058 B2 10/2006 Lo et al.
7,119,493 B2 10/2006 Fryer et al.
7,122,835 B1 10/2006 Ikeda et al.
7,127,380 B1 10/2006 Iverson et al.
7,129,914 B2 10/2006 Knapp et al.
7,129,917 B2 10/2006 Yamazaki et al.
7,141,821 B1 11/2006 Yamazaki et al.
7,164,417 B2 1/2007 Cok
7,193,589 B2 3/2007 Yoshida et al.
7,199,516 B2 4/2007 Seo et al.
7,220,997 B2 5/2007 Nakata
7,224,332 B2 5/2007 Cok
7,227,519 B1 6/2007 Kawase et al.
7,235,810 B1 6/2007 Yamazaki et al.
7,245,277 B2 * 7/2007 Ishizuka ..... 345/78
7,248,236 B2 7/2007 Nathan et al.
7,262,753 B2 8/2007 Tanghe et al.
7,264,979 B2 9/2007 Yamagata et al.
7,274,345 B2 * 9/2007 Imamura et al. ..... 345/76
7,274,363 B2 9/2007 Ishizuka et al.
7,279,711 B1 10/2007 Yamazaki et al.
7,304,621 B2 12/2007 Oomori et al.
7,310,092 B2 12/2007 Imamura
7,315,295 B2 1/2008 Kimura
7,317,429 B2 1/2008 Shirasaki et al.
7,319,465 B2 1/2008 Mikami et al.
7,321,348 B2 1/2008 Cok et al.
7,339,560 B2 3/2008 Sun
7,339,636 B2 3/2008 Voloschenko et al.
7,355,574 B1 4/2008 Leon et al.
7,358,941 B2 4/2008 Ono et al.
7,368,868 B2 5/2008 Sakamoto
7,402,467 B1 7/2008 Kadono et al.
7,411,571 B2 8/2008 Huh
7,414,600 B2 8/2008 Nathan et al.
7,423,617 B2 9/2008 Giraldo et al.
7,432,885 B2 10/2008 Asano et al.
7,474,285 B2 1/2009 Kimura
7,485,478 B2 2/2009 Yamagata et al.
7,502,000 B2 3/2009 Yuki et al.
7,528,812 B2 5/2009 Tsuge et al.
7,535,449 B2 5/2009 Miyazawa
7,554,512 B2 6/2009 Steer
7,569,849 B2 8/2009 Nathan et al.
7,576,718 B2 8/2009 Miyazawa
7,580,012 B2 8/2009 Kim et al.
7,589,707 B2 9/2009 Chou
7,609,239 B2 10/2009 Chang
7,619,594 B2 11/2009 Hu
7,619,597 B2 11/2009 Nathan et al.
7,633,470 B2 12/2009 Kane
7,656,370 B2 2/2010 Schneider et al.
7,697,052 B1 4/2010 Yamazaki et al.
7,800,558 B2 9/2010 Routley et al.
7,825,419 B2 11/2010 Yamagata et al.
7,847,764 B2 12/2010 Cok et al.
7,859,492 B2 12/2010 Kohno
7,868,859 B2 1/2011 Tomida et al.
7,876,294 B2 1/2011 Sasaki et al.
7,924,249 B2 4/2011 Nathan et al.
7,932,883 B2 4/2011 Klompenhouwer et al.
7,948,170 B2 5/2011 Striakhilev et al.
7,969,390 B2 6/2011 Yoshida
7,978,187 B2 7/2011 Nathan et al.
7,994,712 B2 8/2011 Sung et al.
7,995,010 B2 8/2011 Yamazaki et al.
8,026,876 B2 9/2011 Nathan et al.
8,044,893 B2 10/2011 Nathan et al.
8,049,420 B2 11/2011 Tamura et al.
8,077,123 B2 12/2011 Naugler, Jr.
8,115,707 B2 2/2012 Nathan et al.
8,223,177 B2 7/2012 Nathan et al.
8,232,939 B2 7/2012 Nathan et al.
8,259,044 B2 9/2012 Nathan et al.
8,264,431 B2 9/2012 Bulovic et al.
8,279,143 B2 10/2012 Nathan et al.
8,339,386 B2 12/2012 Leon et al.
8,378,362 B2 2/2013 Heo et al.
8,493,295 B2 7/2013 Yamazaki et al.
8,497,525 B2 7/2013 Yamagata et al.
2001/0002703 A1 6/2001 Koyama
2001/0004190 A1 6/2001 Nishi et al.
2001/0009283 A1 7/2001 Arao et al.
2001/0013806 A1 8/2001 Notani
2001/0015653 A1 8/2001 De Jong et al.
2001/0020926 A1 9/2001 Kuijk
2001/0024181 A1 9/2001 Kubota
2001/0024186 A1 9/2001 Kane et al.
2001/0026127 A1 10/2001 Yoneda et al.
2001/0026179 A1 10/2001 Saeki
2001/0026257 A1 10/2001 Kimura
2001/0030323 A1 10/2001 Ikeda
2001/0033199 A1 10/2001 Aoki
2001/0038098 A1 11/2001 Yamazaki et al.
2001/0040541 A1 11/2001 Yoneda et al.
2001/0043173 A1 11/2001 Troutman
2001/0045929 A1 11/2001 Prache et al.
2001/0052606 A1 12/2001 Sempel et al.
2001/0052898 A1 12/2001 Osame et al.
2001/0052940 A1 12/2001 Hagihara et al.
2002/0000576 A1 1/2002 Inukai
2002/0011796 A1 1/2002 Koyama
2002/0011799 A1 1/2002 Kimura
2002/0011981 A1 1/2002 Kuijk
2002/0012057 A1 1/2002 Kimura
2002/0014851 A1 2/2002 Tai et al.
2002/0015031 A1 2/2002 Fujita et al.
2002/0015032 A1 2/2002 Koyama et al.
2002/0018034 A1 2/2002 Ohki et al.
2002/0030190 A1 3/2002 Ohtani et al.
2002/0030528 A1 3/2002 Matsumoto et al.

(56) References Cited

U.S. PATENT DOCUMENTS

2002/0030647 A1 3/2002 Hack et al.
2002/0036463 A1 3/2002 Yoneda et al.
2002/0047565 A1 4/2002 Nara et al.
2002/0047852 A1 4/2002 Inukai et al.
2002/0048829 A1 4/2002 Yamazaki et al.
2002/0050795 A1 5/2002 Imura
2002/0052086 A1 5/2002 Maeda
2002/0053401 A1 5/2002 Ishikawa et al.
2002/0067134 A1 6/2002 Kawashima
2002/0070909 A1 6/2002 Asano et al.
2002/0080108 A1 6/2002 Wang
2002/0084463 A1 7/2002 Sanford et al.
2002/0101172 A1 8/2002 Bu
2002/0101433 A1 8/2002 McKnight
2002/0105279 A1 8/2002 Kimura
2002/0113248 A1 8/2002 Yamagata et al.
2002/0117722 A1 8/2002 Osada et al.
2002/0122308 A1* 9/2002 Ikeda ..... 362/259
2002/0130686 A1 9/2002 Forbes
2002/0154084 A1 10/2002 Tanaka et al.
2002/0158587 A1 10/2002 Komiya
2002/0158666 A1 10/2002 Azami et al.
2002/0158823 A1 10/2002 Zavracky et al.
2002/0163314 A1 11/2002 Yamazaki et al.
2002/0167471 A1* 11/2002 Everitt ..... 345/76
2002/0167474 A1 11/2002 Everitt
2002/0180369 A1 12/2002 Koyama
2002/0180721 A1 12/2002 Kimura et al.
2002/0186214 A1 12/2002 Siwinski
2002/0190332 A1 12/2002 Lee et al.
2002/0190924 A1 12/2002 Asano et al.
2002/0190971 A1 12/2002 Nakamura et al.
2002/0195967 A1 12/2002 Kim et al.
2002/0195968 A1 12/2002 Sanford et al.
2003/0020413 A1 1/2003 Oomura
2003/0030603 A1 2/2003 Shimoda
2003/0043088 A1 3/2003 Booth et al.
2003/0057895 A1 3/2003 Kimura
2003/0058226 A1 3/2003 Bertram et al.
2003/0062524 A1 4/2003 Kimura
2003/0063081 A1* 4/2003 Kimura et al. ..... 345/211
2003/0071821 A1 4/2003 Sundahl et al.
2003/0076048 A1 4/2003 Rutherford
2003/0090445 A1 5/2003 Chen et al.
2003/0090447 A1 5/2003 Kimura
2003/0090481 A1 5/2003 Kimura
2003/0095087 A1 5/2003 Libsch
2003/0107560 A1 6/2003 Yumoto et al.
2003/0111966 A1 6/2003 Mikami et al.
2003/0122745 A1 7/2003 Miyazawa
2003/0122813 A1 7/2003 Ishizuki et al.
2003/0140958 A1 7/2003 Yang et al.
2003/0142088 A1 7/2003 LeChevalier
2003/0151569 A1 8/2003 Lee et al.
2003/0156101 A1 8/2003 LeChevalier
2003/0169219 A1 9/2003 LeChevalier
2003/0174152 A1 9/2003 Noguchi
2003/0179626 A1 9/2003 Sanford et al.
2003/0197663 A1 10/2003 Lee et al.
2003/0206060 A1 11/2003 Suzuki
2003/0210256 A1 11/2003 Mori et al.
2003/0230141 A1 12/2003 Gilmour et al.
2003/0230980 A1 12/2003 Forrest et al.
2003/0231148 A1 12/2003 Lin et al.
2004/0027063 A1 2/2004 Nishikawa
2004/0032382 A1 2/2004 Cok et al.
2004/0056604 A1 3/2004 Shih et al.
2004/0066357 A1 4/2004 Kawasaki
2004/0070557 A1 4/2004 Asano et al.
2004/0070565 A1 4/2004 Nayar et al.
2004/0080262 A1 4/2004 Park et al.
2004/0080470 A1 4/2004 Yamazaki et al.
2004/0090186 A1 5/2004 Kanauchi et al.
2004/0090400 A1* 5/2004 Yoo ..... 345/76
2004/0095297 A1 5/2004 Libsch et al.
2004/0100427 A1 5/2004 Miyazawa
2004/0108518 A1 6/2004 Jo
2004/0113903 A1 6/2004 Mikami et al.
2004/0129933 A1 7/2004 Nathan et al.
2004/0130516 A1 7/2004 Nathan et al.
2004/0135749 A1 7/2004 Kondakov et al.
2004/0145547 A1 7/2004 Oh
2004/0150592 A1* 8/2004 Mizukoshi et al. ..... 345/76
2004/0150594 A1 8/2004 Koyama et al.
2004/0150595 A1 8/2004 Kasai
2004/0155841 A1 8/2004 Kasai
2004/0174347 A1* 9/2004 Sun et al. ..... 345/204
2004/0174349 A1 9/2004 Libsch
2004/0174354 A1 9/2004 Ono et al.
2004/0178743 A1 9/2004 Miller et al.
2004/0183759 A1 9/2004 Stevenson et al.
2004/0189627 A1 9/2004 Shirasaki et al.
2004/0196275 A1 10/2004 Hattori
2004/0201554 A1 10/2004 Satoh
2004/0207615 A1 10/2004 Yumoto
2004/0239596 A1* 12/2004 Ono et al. ..... 345/76
2004/0252089 A1 12/2004 Ono et al.
2004/0257313 A1 12/2004 Kawashima et al.
2004/0257353 A1 12/2004 Imamura et al.
2004/0257355 A1 12/2004 Naugler
2004/0263437 A1 12/2004 Hattori
2004/0263444 A1 12/2004 Kimura
2004/0263445 A1 12/2004 Inukai et al.
2004/0263541 A1 12/2004 Takeuchi et al.
2005/0007355 A1 1/2005 Miura
2005/0007357 A1 1/2005 Yamashita et al.
2005/0014891 A1 1/2005 Quinn
2005/0017650 A1 1/2005 Fryer et al.
2005/0024081 A1 2/2005 Kuo et al.
2005/0024393 A1 2/2005 Kondo et al.
2005/0030267 A1 2/2005 Tanghe et al.
2005/0035709 A1 2/2005 Furuie et al.
2005/0057484 A1 3/2005 Diefenbaugh et al.
2005/0057580 A1 3/2005 Yamano et al.
2005/0067970 A1 3/2005 Libsch et al.
2005/0067971 A1 3/2005 Kane
2005/0068270 A1* 3/2005 Awakura et al. ..... 345/76
2005/0068275 A1 3/2005 Kane
2005/0073264 A1 4/2005 Matsumoto
2005/0083323 A1 4/2005 Suzuki et al.
2005/0088103 A1* 4/2005 Kageyama et al. ..... 315/169.3
2005/0110420 A1 5/2005 Arnold et al.
2005/0110807 A1 5/2005 Chang
2005/0117096 A1 6/2005 Voloschenko et al.
2005/0140598 A1* 6/2005 Kim et al. ..... 345/76
2005/0140610 A1 6/2005 Smith et al.
2005/0145891 A1 7/2005 Abe
2005/0156831 A1 7/2005 Yamazaki et al.
2005/0168416 A1* 8/2005 Hashimoto et al. ..... 345/76
2005/0179626 A1 8/2005 Yuki et al.
2005/0179628 A1 8/2005 Kimura
2005/0185200 A1 8/2005 Tobol
2005/0200575 A1 9/2005 Kim et al.
2005/0206590 A1 9/2005 Sasaki et al.
2005/0219184 A1 10/2005 Zehner et al.
2005/0225686 A1 10/2005 Brummack et al.
2005/0248515 A1 11/2005 Naugler et al.
2005/0260777 A1 11/2005 Brabec et al.
2005/0269959 A1 12/2005 Uchino et al.
2005/0269960 A1* 12/2005 Ono et al. ..... 315/169.3
2005/0280615 A1 12/2005 Cok et al.
2005/0280766 A1 12/2005 Johnson et al.
2005/0285822 A1 12/2005 Reddy et al.
2005/0285825 A1 12/2005 Eom et al.
2006/0001613 A1 1/2006 Routley et al.
2006/0007072 A1 1/2006 Choi et al.
2006/0012310 A1 1/2006 Chen et al.
2006/0012311 A1 1/2006 Ogawa
2006/0027807 A1 2/2006 Nathan et al.
2006/0030084 A1* 2/2006 Young ..... 438/149
2006/0038758 A1 2/2006 Routley et al.
2006/0038762 A1 2/2006 Chou
2006/0050032 A1* 3/2006 Gunner et al. ..... 345/82
2006/0066527 A1 3/2006 Chou

(56) References Cited

U.S. PATENT DOCUMENTS

| | | | | |
|---|---|---|---|---|
| 2006/0066533 | A1 | 3/2006 | Sato et al. | |
| 2006/0077135 | A1 | 4/2006 | Cok et al. | |
| 2006/0082523 | A1 | 4/2006 | Guo et al. | |
| 2006/0092185 | A1 | 5/2006 | Jo et al. | |
| 2006/0097628 | A1 | 5/2006 | Suh et al. | |
| 2006/0097631 | A1 | 5/2006 | Lee | |
| 2006/0103611 | A1 | 5/2006 | Choi | |
| 2006/0149493 | A1 | 7/2006 | Sambandan et al. | |
| 2006/0158402 | A1* | 7/2006 | Nathan et al. | 345/82 |
| 2006/0170623 | A1 | 8/2006 | Naugler, Jr. et al. | |
| 2006/0176250 | A1 | 8/2006 | Nathan et al. | |
| 2006/0208961 | A1 | 9/2006 | Nathan et al. | |
| 2006/0208971 | A1* | 9/2006 | Deane | 345/76 |
| 2006/0232522 | A1 | 10/2006 | Roy et al. | |
| 2006/0244697 | A1 | 11/2006 | Lee et al. | |
| 2006/0261841 | A1 | 11/2006 | Fish | |
| 2006/0264143 | A1 | 11/2006 | Lee et al. | |
| 2006/0273997 | A1 | 12/2006 | Nathan et al. | |
| 2006/0284801 | A1 | 12/2006 | Yoon et al. | |
| 2006/0284895 | A1 | 12/2006 | Marcu et al. | |
| 2006/0290618 | A1 | 12/2006 | Goto | |
| 2007/0001937 | A1 | 1/2007 | Park et al. | |
| 2007/0001939 | A1* | 1/2007 | Hashimoto et al. | 345/76 |
| 2007/0008268 | A1 | 1/2007 | Park et al. | |
| 2007/0008297 | A1 | 1/2007 | Bassetti | |
| 2007/0057873 | A1 | 3/2007 | Uchino et al. | |
| 2007/0069998 | A1 | 3/2007 | Naugler et al. | |
| 2007/0075727 | A1 | 4/2007 | Nakano et al. | |
| 2007/0076226 | A1 | 4/2007 | Klompenhouwer et al. | |
| 2007/0080905 | A1* | 4/2007 | Takahara | 345/76 |
| 2007/0080906 | A1 | 4/2007 | Tanabe | |
| 2007/0080908 | A1 | 4/2007 | Nathan et al. | |
| 2007/0080918 | A1 | 4/2007 | Kawachi et al. | |
| 2007/0097038 | A1 | 5/2007 | Yamazaki et al. | |
| 2007/0097041 | A1 | 5/2007 | Park et al. | |
| 2007/0103419 | A1 | 5/2007 | Uchino et al. | |
| 2007/0115221 | A1 | 5/2007 | Buchhauser et al. | |
| 2007/0182671 | A1 | 8/2007 | Nathan et al. | |
| 2007/0236517 | A1 | 10/2007 | Kimpe | |
| 2007/0241999 | A1 | 10/2007 | Lin | |
| 2007/0273294 | A1 | 11/2007 | Nagayama | |
| 2007/0285359 | A1 | 12/2007 | Ono | |
| 2007/0290958 | A1 | 12/2007 | Cok | |
| 2007/0296672 | A1 | 12/2007 | Kim et al. | |
| 2008/0001525 | A1 | 1/2008 | Chao et al. | |
| 2008/0001544 | A1 | 1/2008 | Murakami et al. | |
| 2008/0036708 | A1* | 2/2008 | Shirasaki et al. | 345/76 |
| 2008/0042942 | A1* | 2/2008 | Takahashi | 345/77 |
| 2008/0042948 | A1 | 2/2008 | Yamashita et al. | |
| 2008/0048951 | A1 | 2/2008 | Naugler, Jr. et al. | |
| 2008/0055209 | A1 | 3/2008 | Cok | |
| 2008/0074413 | A1 | 3/2008 | Ogura | |
| 2008/0088549 | A1 | 4/2008 | Nathan et al. | |
| 2008/0088648 | A1 | 4/2008 | Nathan et al. | |
| 2008/0117144 | A1 | 5/2008 | Nakano et al. | |
| 2008/0150847 | A1 | 6/2008 | Kim et al. | |
| 2008/0158115 | A1 | 7/2008 | Cordes et al. | |
| 2008/0231558 | A1 | 9/2008 | Naugler | |
| 2008/0231562 | A1 | 9/2008 | Kwon | |
| 2008/0252571 | A1 | 10/2008 | Hente et al. | |
| 2008/0290805 | A1 | 11/2008 | Yamada et al. | |
| 2008/0297055 | A1 | 12/2008 | Miyake et al. | |
| 2009/0032807 | A1 | 2/2009 | Shinohara et al. | |
| 2009/0058772 | A1 | 3/2009 | Lee | |
| 2009/0160743 | A1 | 6/2009 | Tomida et al. | |
| 2009/0174628 | A1 | 7/2009 | Wang et al. | |
| 2009/0184901 | A1 | 7/2009 | Kwon | |
| 2009/0195483 | A1 | 8/2009 | Naugler, Jr. et al. | |
| 2009/0201281 | A1 | 8/2009 | Routley et al. | |
| 2009/0213046 | A1* | 8/2009 | Nam | 345/76 |
| 2010/0004891 | A1 | 1/2010 | Ahlers et al. | |
| 2010/0026725 | A1 | 2/2010 | Smith | |
| 2010/0039422 | A1 | 2/2010 | Seto | |
| 2010/0060911 | A1 | 3/2010 | Marcu et al. | |
| 2010/0079711 | A1 | 4/2010 | Tanaka | |
| 2010/0165002 | A1 | 7/2010 | Ahn | |
| 2010/0194670 | A1 | 8/2010 | Cok | |
| 2010/0207960 | A1 | 8/2010 | Kimpe et al. | |
| 2010/0277400 | A1 | 11/2010 | Jeong | |
| 2010/0315319 | A1 | 12/2010 | Cok et al. | |
| 2010/0328294 | A1 | 12/2010 | Sasaki et al. | |
| 2011/0069051 | A1 | 3/2011 | Nakamura et al. | |
| 2011/0069089 | A1 | 3/2011 | Kopf et al. | |
| 2011/0074750 | A1 | 3/2011 | Leon et al. | |
| 2011/0090210 | A1 | 4/2011 | Sasaki et al. | |
| 2011/0149166 | A1 | 6/2011 | Botzas et al. | |
| 2011/0227964 | A1 | 9/2011 | Chaji et al. | |
| 2011/0273399 | A1 | 11/2011 | Lee | |
| 2011/0293480 | A1 | 12/2011 | Mueller | |
| 2012/0056558 | A1 | 3/2012 | Toshiya et al. | |
| 2012/0062565 | A1 | 3/2012 | Fuchs et al. | |
| 2012/0299978 | A1 | 11/2012 | Chaji | |
| 2013/0027381 | A1 | 1/2013 | Nathan et al. | |
| 2013/0032831 | A1 | 2/2013 | Chaji et al. | |
| 2013/0057595 | A1 | 3/2013 | Nathan et al. | |

FOREIGN PATENT DOCUMENTS

| | | | |
|---|---|---|---|
| CA | 2 249 592 | | 7/1998 |
| CA | 2 368 386 | | 9/1999 |
| CA | 2 242 720 | | 1/2000 |
| CA | 2 354 018 | | 6/2000 |
| CA | 2 432 530 | | 7/2002 |
| CA | 2 436 451 | | 8/2002 |
| CA | 2 438 577 | | 8/2002 |
| CA | 2 483 645 | | 12/2003 |
| CA | 2 463 653 | | 1/2004 |
| CA | 2 498 136 | | 3/2004 |
| CA | 2 522 396 | | 11/2004 |
| CA | 2 443 206 | | 3/2005 |
| CA | 2 472 671 | | 12/2005 |
| CA | 2 567 076 | | 1/2006 |
| CA | 2 526 782 | | 4/2006 |
| CA | 2 550 102 | | 4/2008 |
| CN | 1 381 032 | | 11/2002 |
| CN | 1 448 908 | | 10/2003 |
| CN | 1 760 945 | | 4/2006 |
| DE | 20 2006 005427 | | 6/2006 |
| EP | 0 158 366 | | 10/1985 |
| EP | 0 940 796 | | 9/1999 |
| EP | 1 028 471 | | 8/2000 |
| EP | 1 103 947 | | 5/2001 |
| EP | 1 111 577 | | 6/2001 |
| EP | 1 130 565 | A1 | 9/2001 |
| EP | 1 184 833 | | 3/2002 |
| EP | 1 194 013 | | 3/2002 |
| EP | 1 194 013 | | 4/2002 |
| EP | 1 310 939 | | 5/2003 |
| EP | 1 335 430 | A1 | 8/2003 |
| EP | 1 372 136 | | 12/2003 |
| EP | 1 381 019 | | 1/2004 |
| EP | 1 418 566 | | 5/2004 |
| EP | 1 429 312 | A | 6/2004 |
| EP | 1 439 520 | | 7/2004 |
| EP | 1 465 143 | A | 10/2004 |
| EP | 1 467 408 | | 10/2004 |
| EP | 1 469 448 | A | 10/2004 |
| EP | 1 517 290 | | 3/2005 |
| EP | 1 521 203 | A2 | 4/2005 |
| EP | 1 594 347 | | 11/2005 |
| EP | 1 784 055 | A2 | 5/2007 |
| EP | 1 854 338 | A1 | 11/2007 |
| EP | 1 879 169 | A1 | 1/2008 |
| EP | 1 879 172 | | 1/2008 |
| GB | 2 205 431 | | 12/1988 |
| GB | 2 389 951 | | 12/2003 |
| JP | 12-72298 | | 10/1989 |
| JP | 4-042619 | | 2/1992 |
| JP | 6-314977 | | 11/1994 |
| JP | 8-340243 | | 12/1996 |
| JP | 9 090405 | | 4/1997 |
| JP | 10-153759 | | 6/1998 |
| JP | 10-254410 | | 9/1998 |
| JP | 11-202295 | | 7/1999 |

(56) References Cited

FOREIGN PATENT DOCUMENTS

| | | | |
|---|---|---|---|
| JP | 11-219146 | | 8/1999 |
| JP | 11 231805 | | 8/1999 |
| JP | 11-282419 | | 10/1999 |
| JP | 2000-056847 | | 2/2000 |
| JP | 2000-077192 | | 3/2000 |
| JP | 2000-81607 | | 3/2000 |
| JP | 2000-089198 | | 3/2000 |
| JP | 2000-352941 | | 12/2000 |
| JP | 2001-134217 | | 5/2001 |
| JP | 2001-195014 | | 7/2001 |
| JP | 2002-055654 | | 2/2002 |
| JP | 2002-91376 | | 3/2002 |
| JP | 2002-514320 | | 5/2002 |
| JP | 2002-268576 | | 9/2002 |
| JP | 2002-278513 | | 9/2002 |
| JP | 2002-333862 | | 11/2002 |
| JP | 2003-022035 | | 1/2003 |
| JP | 2003-076331 | | 3/2003 |
| JP | 2003-124519 | | 4/2003 |
| JP | 2003-150082 | | 5/2003 |
| JP | 2003-177709 | | 6/2003 |
| JP | 2003-271095 | | 9/2003 |
| JP | 2003-308046 | | 10/2003 |
| JP | 2003-317944 | | 11/2003 |
| JP | 2004-145197 | | 5/2004 |
| JP | 2004-287345 | | 10/2004 |
| JP | 2005-157217 | | 6/2005 |
| JP | 4-158570 | | 10/2008 |
| KR | 2004-0100887 | | 12/2004 |
| TW | 342486 | | 10/1998 |
| TW | 473622 | | 1/2002 |
| TW | 485337 | | 5/2002 |
| TW | 502233 | | 9/2002 |
| TW | 538650 | | 6/2003 |
| TW | 569173 | | 1/2004 |
| TW | 1221268 | | 9/2004 |
| TW | 1223092 | | 11/2004 |
| TW | 2007-27247 | | 7/2007 |
| WO | WO 94/25954 | | 11/1994 |
| WO | WO 98/48403 | | 10/1998 |
| WO | WO 99/48079 | | 9/1999 |
| WO | WO 01/06484 | | 1/2001 |
| WO | WO 01/27910 | A1 | 4/2001 |
| WO | WO 01/63587 | A2 | 8/2001 |
| WO | 03/063124 | | 3/2002 |
| WO | WO 02/067327 | A | 8/2002 |
| WO | WO 03/001496 | A1 | 1/2003 |
| WO | 03/034389 | | 4/2003 |
| WO | WO 03/034389 | A | 4/2003 |
| WO | WO 03/058594 | A1 | 7/2003 |
| WO | WO 03/063124 | | 7/2003 |
| WO | WO 03/077231 | | 9/2003 |
| WO | WO 03/105117 | | 12/2003 |
| WO | WO 2004/003877 | | 1/2004 |
| WO | WO 2004/025615 | A | 3/2004 |
| WO | WO 2004/034364 | | 4/2004 |
| WO | WO 2004/047058 | | 6/2004 |
| WO | WO 2004/104975 | A1 | 12/2004 |
| WO | WO 2005/022498 | | 3/2005 |
| WO | WO 2005/022500 | A | 3/2005 |
| WO | WO 2005/029455 | | 3/2005 |
| WO | WO 2005/029456 | | 3/2005 |
| WO | WO 2005/055185 | | 6/2005 |
| WO | WO 2006/000101 | A1 | 1/2006 |
| WO | WO 2006/053424 | | 5/2006 |
| WO | 2006/063448 | | 6/2006 |
| WO | WO 2006/063448 | A | 6/2006 |
| WO | WO 2006/084360 | | 8/2006 |
| WO | WO 2006/137337 | | 12/2006 |
| WO | WO 2007/003877 | A | 1/2007 |
| WO | WO 2007/079572 | | 7/2007 |
| WO | WO 2007/120849 | A2 | 10/2007 |
| WO | WO 2009/055920 | | 5/2009 |
| WO | WO 2010/023270 | | 3/2010 |
| WO | WO 2011/041224 | A1 | 4/2011 |

OTHER PUBLICATIONS

Alexander et al.: "Unique Electrical Measurement Technology for Compensation, Inspection, and Process Diagnostics of AMOLED HDTV"; dated May 2010 (4 pages).

Chaji et al.: "A Current-Mode Comparator for Digital Calibration of Amorphous Silicon AMOLED Displays"; dated Jul. 2008 (5 pages).

Chaji et al.: "A fast settling current driver based on the CCII for AMOLED displays"; dated Dec. 2009 (6 pages).

Chaji et al.: "A Low-Cost Stable Amorphous Silicon AMOLED Display with Full V~T- and V~O~L~E~D Shift Compensation"; dated May 2007 (4 pages).

Chaji et al.: "A novel a-Si:H AMOLED pixel circuit based on short-term stress stability of a-Si:H TFTs"; dated Oct. 2005 (3 pages).

Chaji et al.: "A Sub-μA fast-settling current-programmed pixel circuit for AMOLED displays"; dated Sep. 2007.

Chaji et al.: "An Enhanced and Simplified Optical Feedback Pixel Circuit for AMOLED Displays"; dated Oct. 2006.

Chaji et al.: "Compensation technique for DC and transient instability of thin film transistor circuits for large-area devices"; dated Aug. 2008.

Chaji et al.: "Fast and Offset-Leakage Insensitive Current-Mode Line Driver for Active Matrix Displays and Sensors"; dated Feb. 2009 (8 pages).

Chaji et al.: "Low-Cost AMOLED Television with IGNIS Compensating Technology"; dated May 2008 (4 pages).

Chaji et al.: "Low-Power Low-Cost Voltage-Programmed a-Si:H AMOLED Display"; dated Jun. 2008 (5 pages).

Chaji et al.: "Merged phototransistor pixel with enhanced near infrared response and flicker noise reduction for biomolecular imaging"; dated Nov. 2008 (3 pages).

Chaji et al.: "Stable Pixel Circuit for Small-Area High- Resolution a-Si:H AMOLED Displays"; dated Oct. 2008 (6 pages).

Chaji et al.: "Stable RGBW AMOLED display with OLED degradation compensation using electrical feedback"; dated Feb. 2010 (2 pages).

European Search Report and Written Opinion for Application No. 08865338 mailed Nov. 2, 2011 (7 pages).

European Search Report for European Application No. 10000421.7 mailed Mar. 26, 2012 in corresponding (6 pages).

European Search Report for European Application No. 10834294.0-1903, dated Apr. 8, 2013, (9 pages).

European Search Report for European Application No. EP 011122313 dated Sep. 14, 2005 (4 pages).

European Search Report for European Application No. EP 04786661 dated Mar. 9, 2009.

European Search Report for European Application No. EP 05759141 dated Oct. 30, 2009.

European Search Report for European Application No. EP 05819617 dated Jan. 30, 2009.

European Search Report for European Application No. EP 05821114 dated Mar. 27, 2009 (2 pages).

European Search Report for European Application No. EP 06705133 dated Jul. 18, 2008.

European Search Report for European Application No. EP 06721798 dated Nov. 12, 2009 (2 pages).

European Search Report for European Application No. EP 07710608.6 dated Mar. 19, 2010 (7 pages).

European Search Report for European Application No. EP 07719579 dated May 20, 2009.

European Search Report for European Application No. EP 07815784 dated Jul. 20, 2010 (2 pages).

European Search Report for European Application No. EP 10166143, dated Sep. 3, 2010 (2 pages).

European Search Report for European Application No. EP 11739485.8-1904 dated Aug. 6, 2013, (14 pages).

European Search Report for European Application No. PCT/CA2006/000177 dated Jun. 2, 2006.

European Supplementary Search Report for European Application No. 04786662 dated Jan. 19, 2007 (2 pages).

(56) References Cited

OTHER PUBLICATIONS

Extended European Search Report for European Application No. .09733076.5 mailed Apr. 27, 2011 issued during prosecution (13 pages).
Extended European Search Report for European Application No. 11168677.0 mailed Nov. 29, 2012, (13 page).
Extended European Search Report for European Application No. 11191641.7 mailed Jul. 11, 2012 (14 pages).
Fossum, Eric R.. "Active Pixel Sensors: Are CCD's Dinosaurs?" SPIE: Symposium on Electronic Imaging. Feb. 1, 1993 (13 pages).
Goh et al., "A New a-Si:H Thin-Film Transistor Pixel Circuit for Active-Matrix Organic Light-Emitting Diodes", IEEE Electron Device Letters, vol. 24, No. 9, Sep. 2003, pp. 583-585.
International Preliminary Report on Patentability, PCT/CA2005/001007 dated Oct. 16, 2006, 4 pages.
International Search Report, PCT/CA02/00180 dated Jul. 31, 2002 (3 pages).
International Search Report, PCT/CA2004/001741 dated Feb. 21, 2005.
International Search Report, PCT/CA2004/001742, Canadian Patent Office, dated Feb. 21, 2005 (2 pages).
International Search Report, PCT/CA2005/001007 dated Oct. 18, 2005.
International Search Report, PCT/CA2005/001844 dated Mar. 28, 2006 (2 pages).
International Search Report, PCT/CA2005/001897 mailed Mar. 21, 2006 (2 pages).
International Search Report, PCT/CA2007/000652 dated Jul. 25, 2007.
International Search Report, PCT/CA2008/002307, mailed Apr. 28, 2009 (3 pages).
International Search Report, PCT/CA2009/000501 mailed Jul. 30, 2009 (4 pages).
International Search Report, PCT/CA2009/001769, dated Apr. 8, 2010 (3 pages).
International Search Report, PCT/IB2010/055481, dated Apr. 7, 2011, 3 pages.
International Search Report, PCT/IB2010/055486, Dated Apr. 19, 2011, 5 pages.
International Search Report, PCT/IB2010/055541 filed Dec. 1, 2010, dated May 26, 2011; 5 pages.
International Search Report, PCT/IB2011/050502, dated Jun. 27, 2011 (6 pages).
International Search Report, PCT/IB2011/051103, dated Jul. 8, 2011, 3 pages.
International Search Report, PCT/IB2011/055135, Canadian Patent Office, dated Apr. 16, 2012 (5 pages).
International Search Report, PCT/IB2012/052372, mailed Sep. 12, 2012 (3 pages).
International Search Report, PCT/IB2013/054251, Canadian Patent Office, dated Sep. 11, 2013; (4 pages).
International Search Report, PCT/JP02/09668 mailed Dec. 3, 2002, (4 pages).
International Written Opinion, PCT/CA2004/001742, Canadian Patent Office, dated Feb. 21, 2005 (5 pages).
International Written Opinion, PCT/CA2005/001897 mailed Mar. 21, 2006 (4 pages).
International Written Opinion, PCT/CA2009/000501 Application No. PCT/CA2009/000501 mailed Jul. 30, 2009 (6 pages).
International Written Opinion, PCT/CA2009/000501 mailed Jul. 30, 2009 for International Application No. PCT/CA2009/000501 (6 pages).
International Written Opinion, PCTAB2010/055486, Dated Apr. 19, 2011, 8 pages.
International Written Opinion, PCTAB2010/055541, dated May 26, 2011; 6 pages.
International Written Opinion, PCT/IB2011/050502 dated Jun. 27, 2011 (7 pages).
International Written Opinion, PCT/IB2011/051103, dated Jul. 8, 2011, 6 pages.
International Written Opinion, PCT/IB2011/055135, Canadian Patent Office, dated Apr. 16, 2012 (5 pages).
International Written Opinion, PCT/IB2012/052372, mailed Sep. 12, 2012 (6 pages).
International Written Opinion, PCT/IB2013/054251, Canadian Intellectual Property Office, dated Sep. 11, 2013; (5 pages).
Jafarabadiashtiani et al.: "A New Driving Method for a-Si AMOLED Displays Based on Voltage Feedback"; dated 2005 (4 pages).
Kanicki, J., et al. "Amorphous Silicon Thin-Film Transistors Based Active-Matrix Organic Light-Emitting Displays." Asia Display: International Display Workshops, Sep. 2001 (pp. 315-318).
Karim, K. S., et al. "Amorphous Silicon Active Pixel Sensor Readout Circuit for Digital Imaging." IEEE: Transactions on Electron Devices. vol. 50, No. 1, Jan. 2003 (pp. 200-208).
Ma e y et al: "Organic Light-Emitting Diode/Thin Film Transistor Integration for foldable Displays" Conference record of the 1997 International display research conference and international workshops on LCD technology and emissive technology. Toronto, Sep. 15-19, 1997 (6 pages).
Machine English translation of JP 2002-333862, 49 pages.
Matsueda y et al.: "35.1: 2.5-in. AMOLED with Integrated 6-bit Gamma Compensated Digital Data Driver"; dated May 2004.
Mendes E., et al. "A High Resolution Switch-Current Memory Base Cell." IEEE: Circuits and Systems. vol. 2, Aug. 1999 (pp. 718-721).
Nathan A. et al., "Thin Film imaging technology on glass and plastic" ICM 2000, proceedings of the 12 international conference on microelectronics, dated Oct. 31, 2001 (4 pages).
Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.
Nathan et al.: "Backplane Requirements for active Matrix Organic Light Emitting Diode Displays,"; dated 2006 (16 pages).
Nathan et al.: "Call for papers second international workshop on compact thin-film transistor (TFT) modeling for circuit simulation"; dated Sep. 2009 (1 page).
Nathan et al.: "Invited Paper: a -Si for AMOLED—Meeting the Performance and Cost Demands of Display Applications (Cell Phone to HDTV)", dated 2006 (4 pages).
Office Action in Japanese patent application No. JP2006-527247 dated Mar. 15, 2010. (8 pages).
Office Action in Japanese patent application No. JP2007-545796 dated Sep. 5, 2011. (8 pages).
Office Action issued in Chinese Patent Application 200910246264.4 Dated Jul. 5, 2013; 8 pages.
Partial European Search Report mailed Mar. 20, 2012 which issued in corresponding European Patent Application No. EP 11191641.7 (8 pages).
Partial European Search Report mailed Sep. 22, 2011 corresponding to European Patent Application No. EP 11168677.0 (5 pages).
Patent Abstracts of Japan, vol. 1997, No. 08, Aug. 29, 1997, & JP 09 090405 A, Apr. 4, 1997 Abstract.
Patent Abstracts of Japan, vol. 1999, No. 13, Nov. 30, 1999, & JP 11 231805 A, Aug. 27, 1999 Abstract.
Patent Abstracts of Japan, vol. 2000, No. 09, Oct. 13, 2000—JP 2000 172199 A, Jun. 3, 2000, abstract.
Patent Abstracts of Japan, vol. 2002, No. 03, Apr. 3, 2002 (Apr. 4, 2004 & JP 2001 318627 A (Semiconductor EnergyLab DO Ltd), Nov. 16, 2001, abstract, paragraphs '01331-01801, paragraph '01691, paragraph '01701, paragraph '01721 and figure 10.
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "Three-TFT image sensor for real-time digital X-ray imaging"; dated Feb. 2, 2006 (2 pages).
Sanford, James L., et al., "4.2 TFT AMOLED Pixel Circuits and Driving Methods", SID 03 Digest, ISSN/0003, 2003, pp. 10-13.
Search Report for Taiwan Invention Patent Application No. 093128894 dated May 1, 2012. (1 page).
Search Report for Taiwan Invention Patent Application No. 94144535 dated Nov. 1, 2012. (1 page).

(56) References Cited

OTHER PUBLICATIONS

Singh, et al., "Current Conveyor: Novel Universal Active Block", Samriddhi, S-JPSET vol. I, Issue 1, 2010, pp. 41-48.
Spindler et al., System Considerations for RGBW OLED Displays, Journal of the SID 14/1, 2006, pp. 37-48.
Stewart M. et al., "polysilicon TFT technology for active matrix oled displays" IEEE transactions on electron devices, vol. 48, No. 5, dated May 2001 (7 pages).
Tatsuya Sasaoka et al., 24.4L; Late-News Paper: a 13.0-inch AM-Oled Display with Top Emitting Structure and Adaptive Current Mode Programmed Pixel Circuit (TAC), SID 01 Digest, (2001), pp. 384-387.
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).
Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.
Yu, Jennifer: "Improve OLED Technology for Display", Ph.D. Dissertation, Massachusetts Institute of Technology, Sep. 2008 (151 pages).
Zhiguo Meng et al; "24.3: Active-Matrix Organic Light-Emitting Diode Display implemented Using Metal-Induced Unilaterally Crystallized Polycrystalline Silicon Thin-Film Transistors", SID 01Digest, (2001), pp. 380-383.
Alexander et al.: "Pixel circuits and drive schemes for glass and elastic AMOLED displays"; dated Jul. 2005 (9 pages).
Ashtiani et al.: "AMOLED Pixel Circuit With Electronic Compensation of Luminance Degradation"; dated Mar. 2007 (4 pages).
Chahi et al.: "An Enhanced and Simplified Optical Feedback Pixel Circuit for AMOLED Displays"; dated Oct. 2006.
Chaji et al.: "A low-power driving scheme for a-Si:H active-matrix organic light-emitting diode displays"; dated Jun. 2005 (4 pages).
Chaji et al.: "A low-power high-performance digital circuit for deep submicron technologies"; dated Jun. 2005 (4 pages).
Chaji et al.: "A Novel Driving Scheme and Pixel Circuit for AMOLED Displays"; dated Jun. 2006 (4 pages).
Chaji et al.: "A novel driving scheme for high-resolution large-area a-Si:H AMOLED displays"; dated Aug. 2005 (4 pages).
Chaji et al.: "A Stable Voltage-Programmed Pixel Circuit for a-Si:H AMOLED Displays"; dated Dec. 2006 (12 pages).
Chaji et al.: "Driving scheme for stable operation of 2-TFT a-Si AMOLED pixel"; dated Apr. 2005 (2 pages).
Chaji et al.: "Dynamic-effect compensating technique for stable a-Si:H AMOLED displays"; dated Aug. 2005 (4 pages).
Chaji et al.: "Electrical Compensation of OLED Luminance Degradation"; dated Dec. 2007 (3 pages).
Chaji et al.: "eUTDSP: a design study of a new VLIW-based DSP architecture"; dated May 2003 (4 pages).
Chaji et al.: "High Speed Low Power Adder Design With A New Logic Style: Pseudo Dynamic Logic (SDL)"; dated Oct. 2001 (4 pages).
Chaji et al.: "High-precision, fast current source for large-area current-programmed a-Si flat panels"; dated Sep. 2006 (4 pages).
Chaji et al.: "Low-Cost Stable a-Si:H AMOLED Display for Portable Applications"; dated Jun. 2006 (4 pages).
Chaji et al.: "Parallel Addressing Scheme for Voltage-Programmed Active-Matrix OLED Displays"; dated May 2007 (6 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High-Resolution a-Si:H AMOLED Displays"; dated 2008 (7 pages).
Chaji et al.: "Thin-Film Transistor Integration for Biomedical Imaging and AMOLED Displays"; dated 2008 (177 pages).
He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.
Goh et al., "A New a-Si:H Thin Film Transistor Pixel Circul for Active-Matrix Organic Light-Emitting Diodes", IEEE Electron Device Letters, vol. 24, No. 9, Sep. 2003, 4 pages.
Jafarabadiashtiani et al.: "A New Driving Method for a-Si AMOLED Displays Based on Voltage Feedback"; May 27, 2005 (4 pages).
Lee et al.: "Ambipolar Thin-Film Transistors Fabricated by PECVD Nanocrystalline Silicon"; dated 2006 (6 pages).
Matsueda y et al.: "35.1: 2.5-in. AMOLED with Integrated 6-bit Gamma Compensated Digital Data Driver"; dated May 2004 (4 pages).
Nathan et al., "Amorphous Silicon Thin Film Transistor Circuit Integration Oganic LED Displays on Glass and Plastic", IEEE Journal of Solid-State Circuits, vol. 39, No. 9, Sep. 2004, 12 pages.
Nathan et al.: "Driving schemes for a-Si and LTPS AMOLED displays"; dated Dec. 2005 (11 pages).
Philipp: "Charge transfer sensing" Sensor Review, vol. 19, No. 2, Dec. 31, 1999, 10 pages.
Rafati et al.: "Comparison of a 17 b multiplier in Dual-rail domino and in Dual-rail D L (D L) logic styles"; dated 2002 (4 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "Self-compensated a-Si-H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
International Preliminary Report on Patentability for International Application No. PCT/CA2005/001007 dated Oct. 16, 2006, 4 pages.

* cited by examiner

VOLTAGE-PROGRAMMING SCHEME FOR CURRENT-DRIVEN AMOLED DISPLAYS

Matter enclosed in heavy brackets [ ] appears in the original patent but forms no part of this reissue specification; matter printed in italics indicates the additions made by reissue.

CROSS REFERENCE TO RELATED APPLICATIONS

This is a continuation of U.S. patent application Ser. No. 11/571,480, which is a national stage application of international application no. PCT/CA2005/001007, filed Jun. 28, 2005, which claims the benefit of and priority to Canadian Patent Application No. 2,472,671, filed on Jun. 29, 2004, each of these applications being incorporated herein by reference in its entirety.

FIELD OF INVENTION

The present invention relates to a display technique, and more specifically to technology for driving pixel circuits.

BACKGROUND OF THE INVENTION

Active matrix organic light emitting diode (AMOLED) displays are well known in the art. The AMOLED displays have been increasingly used as a flat panel in a wide variety of tools.

The AMOLED displays are classified as either a voltage-programmed display or a current-programmed display. The voltage-programmed display is driven by a voltage-programmed scheme where data is applied to the display as a voltage. The current-programmed display is driven by a current-programmed scheme where data is applied to the display as a current.

The advantage of the current-programming scheme is that it can facilitate pixel designs where the brightness of the pixel remains more constant over time than with voltage programming. However, the current-programming requires longer time of charging capacitors associated with the column.

Therefore, there is a need to provide a new scheme for driving a current-driven AMOLED display, which ensures high speed and high quality.

SUMMARY OF THE INVENTION

The present invention relates to a system and method of driving a pixel circuit in an AMOLED display.

The system and method of the present invention uses Voltage-Programming Scheme For Current-Driven AMOLED Displays.

In accordance with an aspect of the present invention there is provided a system for driving a display which includes a plurality of pixel circuits, each having a plurality of thin film transistors (TFTs) and an organic light emitting diode (OLED), which includes: a voltage driver for generating a voltage to program the pixel circuit; a programmable current source for generating a current to program the pixel circuit; and a switching network for selectively connecting the data driver or the current source to one or more pixel circuits.

In accordance with a further aspect of the present invention there is provided a system for driving a pixel circuit having a plurality of thin film transistors (TFTs) and an organic light emitting diode (OLED), which includes: a pre-charge controller for pre-charging and discharging a data node of the pixel circuit to acquire threshold voltage information of the TFT from the data node; and a hybrid driving circuit for programming the pixel circuit based on the acquired threshold voltage information and video data information displayed on the pixel circuit.

In accordance with a further aspect of the present invention there is provided a system for driving a pixel circuit having a plurality of thin film transistors (TFTs) and an organic light emitting diode (OLED), which includes: a sampler for sampling, from a data node of the pixel circuit, a voltage required to program the pixel circuit; and a programming circuit for programming the pixel circuit based on the sampled voltage and video data information displayed on the pixel circuit.

In accordance with a further aspect of the present invention there is provided a method of driving a pixel circuit having a plurality of thin film transistors (TFTs) and an organic light emitting diode (OLED), which includes the steps of: selecting a pixel circuit and pre-charging a data node of the pixel circuit; allowing the pre-charged data node to be discharged; extracting a threshold voltage of the TFT through the discharging step; and programming the pixel circuit, including compensating a programming data based on the extracted threshold voltage.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

Embodiments of the present invention are described using an AMOLED display. Drive scheme described below is applicable to a current programmed (driven) pixel circuit and a voltage programmed (driven) pixel circuit.

In addition, hybrid technique described below can be applied to any existing driving scheme, including a) any drive schemes that use sophisticated timing of the data, select, or power inputs to the pixels to achieve increased brightness uniformity, b) any drive schemes that use current or voltage feedback, c) any drive schemes that use optical feedback.

The light emitting material of the pixel circuit can be any technology, specifically organic light emitting diode (OLED) technology, and in particular, but not limited to, fluorescent, phosphorescent, polymer, and dendrimer materials.

Figure 1:
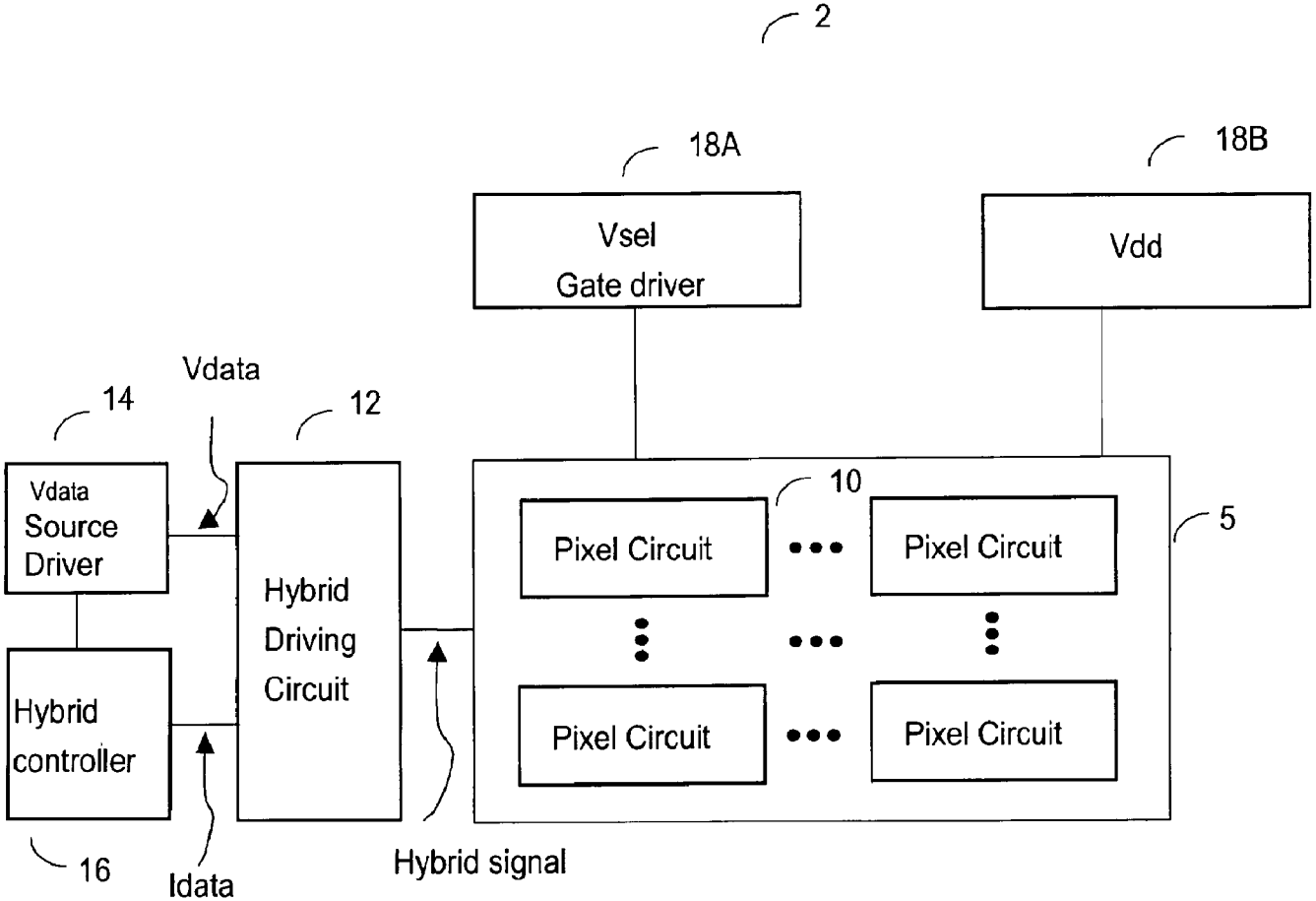
FIG. 1 is a block diagram showing a system for driving an AMOLED display in accordance with an embodiment of the present invention.

Referring to FIG. 1, there is illustrated a system 2 for driving an AMOLED display 5 in accordance with an embodiment of the present invention. The AMOLED display 5 includes a plurality of pixel circuits. In FIG. 1, four pixel circuits 10 are shown as an example.

The system 2 includes a hybrid driving circuit 12, a voltage source driver 14, a hybrid programming controller 16, a gate driver 18A and a power-supply 18B. The pixel circuit 10 is selected by the gate driver 18A (Vsel), and is programmed by either voltage mode using a node Vdata or current mode using a node Idata. The hybrid driving circuit 12 selects the mode of programming, and connects it to the pixel circuit 10 through a hybrid signal. A pre-charge signal (Vp) is applied to the pixel circuit 10 to acquire threshold Vt information (or Vt shift information) from the pixel circuit 10. The hybrid driving circuit 12 controls the pre-charging, if pre-charging technique is used. The pre-charge signal (Vp) may be generated within the hybrid driving circuit 12, which depends on the operation condition. The power-supply 18B (Vdd) supplies the current required to energize the display 5 and to monitor the power consumption of the display 5.

The hybrid controller 16 controls the individual components that make up the entire hybrid programming circuit. The hybrid controller 16 handles timing and controls the order in which the required functions occur. The hybrid controller 16 may generate data Idata and supplied to the hybrid driving circuit 12. The system 2 may have a reference current source, and the Idata may be supplied under the control of the hybrid controller 16.

The hybrid driver 12 may be implemented either as a switching matrix, or as the hybrid driving circuit(s) of FIG. 3, 6, 8 or 20 or combination thereof.

In the description, Vdata refers to data, a data signal, a data line or a node for supplying the data or data signal Vdata, or a voltage on the data line or the node. Similarly, Idata refers to data, a data signal, a data line or a node for supplying the data or data signal Idata, or a current on the data line or the node. Vp refers to a pre-charge signal, a pre-charge pulse, a pre-charge voltage for pre-charging/discharging, a line or a node for supplying the pre-charge signal, pre-charge pulse or pre-charge voltage Vp. Vsel refers to a pulse or a signal for selecting a pixel circuit or a line or a node for supplying the pulse or signal Vs. The terms "hybrid signal", "hybrid signal node", and "hybrid signal line" may be used interchangeably.

The pixel circuit 10 includes a plurality of TFTs, and an organic light emitting diode (OLED). The TFT may be an n-type TFT or a p-type TFT. The TFT is, for example, but not limited to, an amorphous silicon (a-Si:H) based TFT, a poly-crystalline silicon based TFT, a crystalline silicon based TFT, or an organic semiconductor based TFT. The OLED may be regular (P-I-N) stack or inverted (N-I-P) stack. The OLED can be located in the source or the drain of one or more driving TFTs.

Figure 2:
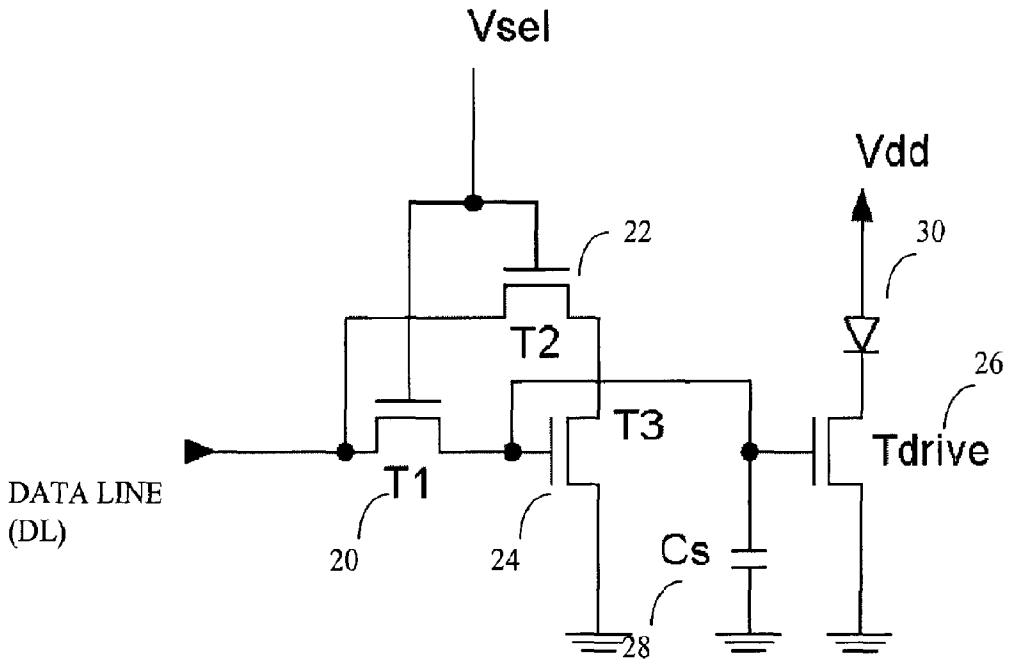
FIG. 2 is a schematic diagram showing one example of a pixel circuit of FIG. 1.

FIG. 2 illustrates an example of the pixel circuit 10 of FIG. 1. The pixel circuit of FIG. 2 includes four thin film transistors (TFTs) 20-26, a capacitor Cs 28 and an organic light emitter diode (OLED) 30. The TFT (Tdrive) 26 is a drive TFT that is connected to the OLED 30 and the capacitor Cs 28. The pixel circuit of FIG. 2 is selected by the select line Vsel, and is programmed by a data line DL. The data line DL is controlled by the hybrid signal output from the hybrid driving circuit 12 of FIG. 1.

In FIG. 2, four TFTs are illustrated. However, the pixel circuit 10 of FIG. 1 may include less than four TFTs or more than four TFTs.

In the description, the terms "data line DL" and "data node DL" may be used interchangeably.

Referring to FIGS. 1-2, the data node DL is pre-charged and discharged to acquire the threshold Vt of a drive TFT (e.g., Tdrive 26 of FIG. 2) or the threshold Vt shift. In the description, Vt shift, Vt shift information, Vt, and Vt information may be used interchangeably. The pixel circuit 10 is then consecutively programmed by the source driver 14 using voltage-programming. The acquired Vt shift information is utilized to compensate for degradation of the pixel circuit 10, thus maintaining uniform brightness of the display 5.

The process of acquiring Vt starts by applying Vsel to T1 20 and T2 22 to the pixel circuit illustrated in FIG. 2. Such action causes the drain and gate of T3 24 to be at the same voltage. This allows the Vt of T3 24 to be extracted by first applying the pre-charge voltage Vp to the data line DL, which is than allowed to be discharged. The rate of discharge is a function of Vt. Thus, by measure of the rate of discharge, Vt can be obtained.

Figure 3:
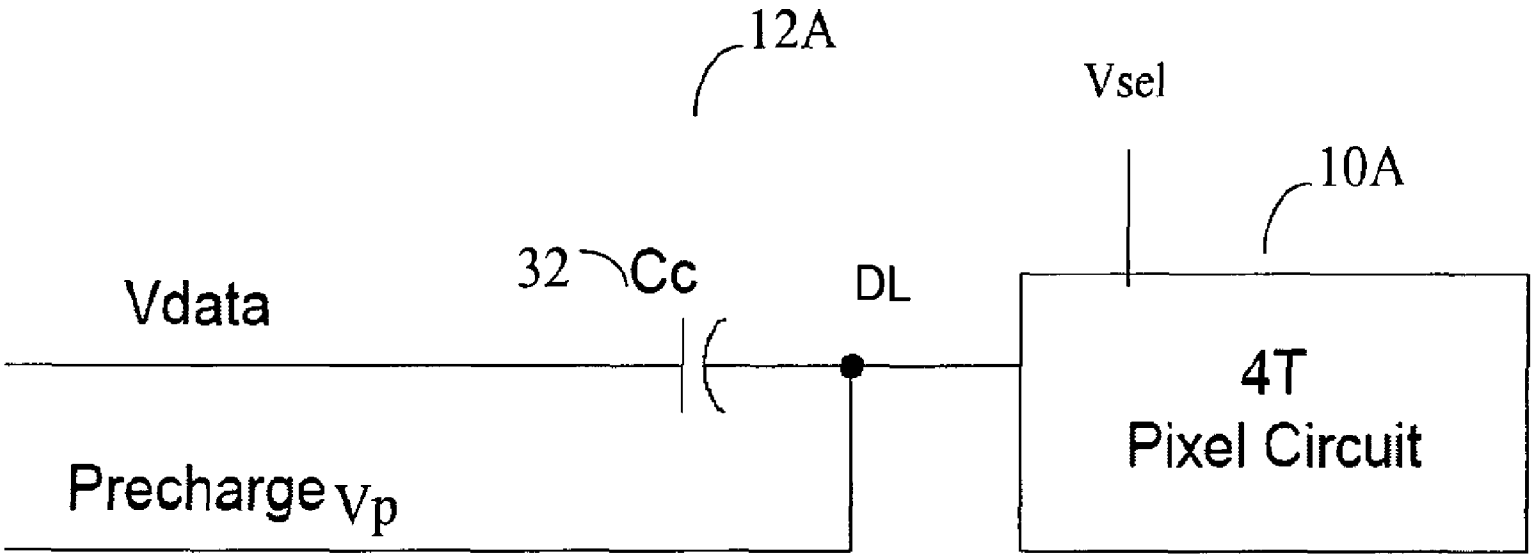
FIG. 3 is a schematic diagram showing an example of a hybrid driving circuit, which is applicable to FIG. 1.

FIG. 3 illustrates an example of a hybrid driving circuit, which is applicable to the hybrid driving circuit 12 of FIG. 1. The hybrid driving circuit 12A of FIG. 3 implements voltage programming technique.

The hybrid driving circuit 12A of FIG. 3 includes a charge programming capacitor Cc 32. The charge programming capacitor Cc 32 is provided between the data line Vdata and the data node DL. The pre-charge line Vp is also connected to the data node DL.

The hybrid driving circuit 12A is provided to a pixel circuit 10A having four TFTs (such as the pixel circuit of FIG. 2). However, the pixel circuit 10A may include more than four TFTs or less than four TFTs.

The charge programming capacitor Cc 32 is provided to program the pixel circuit 10A with a voltage that is equal to the sum of threshold Vt of the TFT and Vdata, scaled by a constant K. The constant is determined by the voltage division network formed by the charge storage capacitor (e.g. Cs 28 of FIG. 2) and the charge programming capacitor Cc 32.

Figure 4:
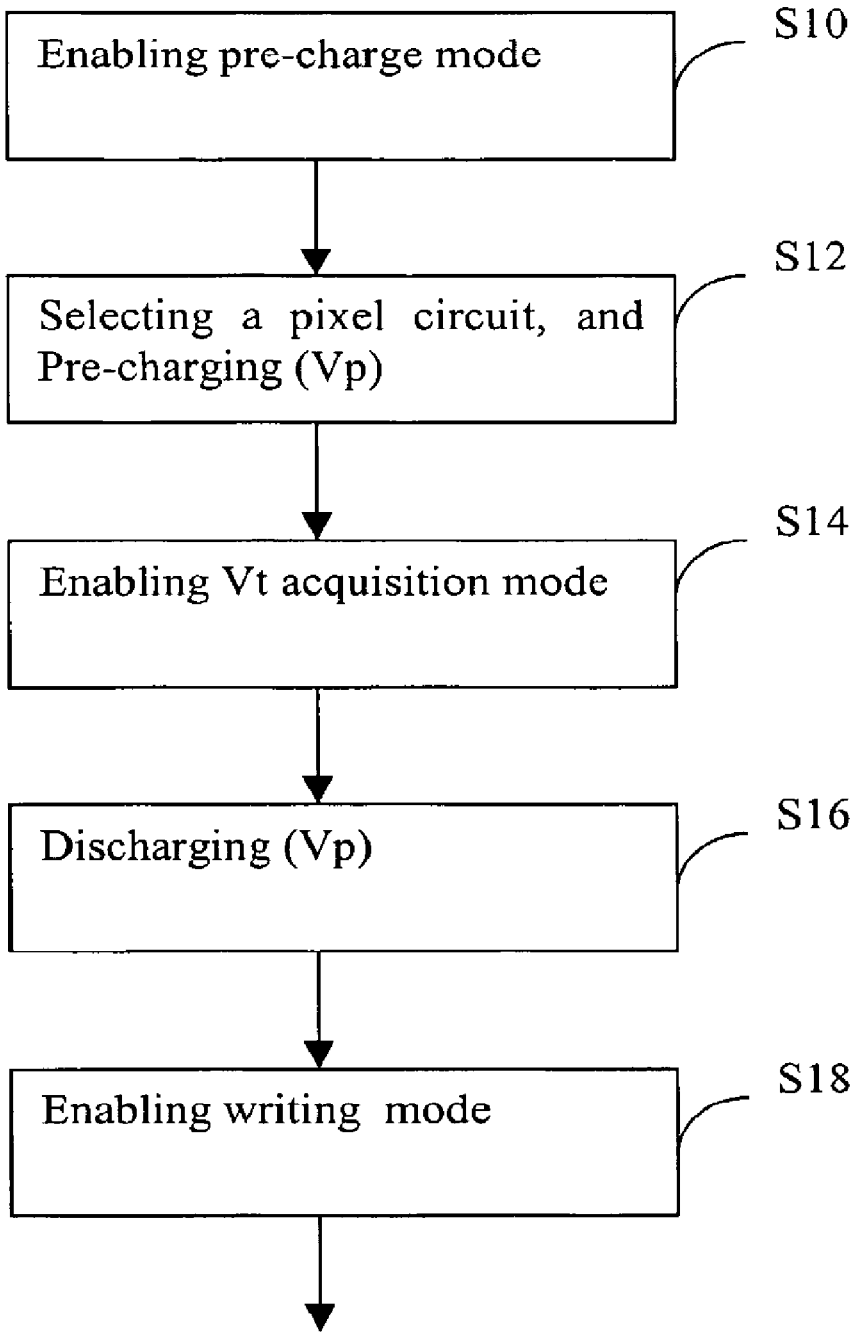
FIG. 4 is an exemplary flow chart for showing the operation of the hybrid driving circuit of FIG. 3.

FIG. 4 illustrates an exemplary flow chart for showing the operation of the hybrid driving circuit 12A of FIG. 3. At step S10, pre-charge mode is enabled. At step S12, a pixel circuit is selected and pre-charging (Vp) is started. At step S14, Vt acquisition mode is enabled, and at step S16, discharging (Vp) starts. The Vt information is acquired through Cc 32. Then at step S18, writing mode is enabled.

Figure 5:
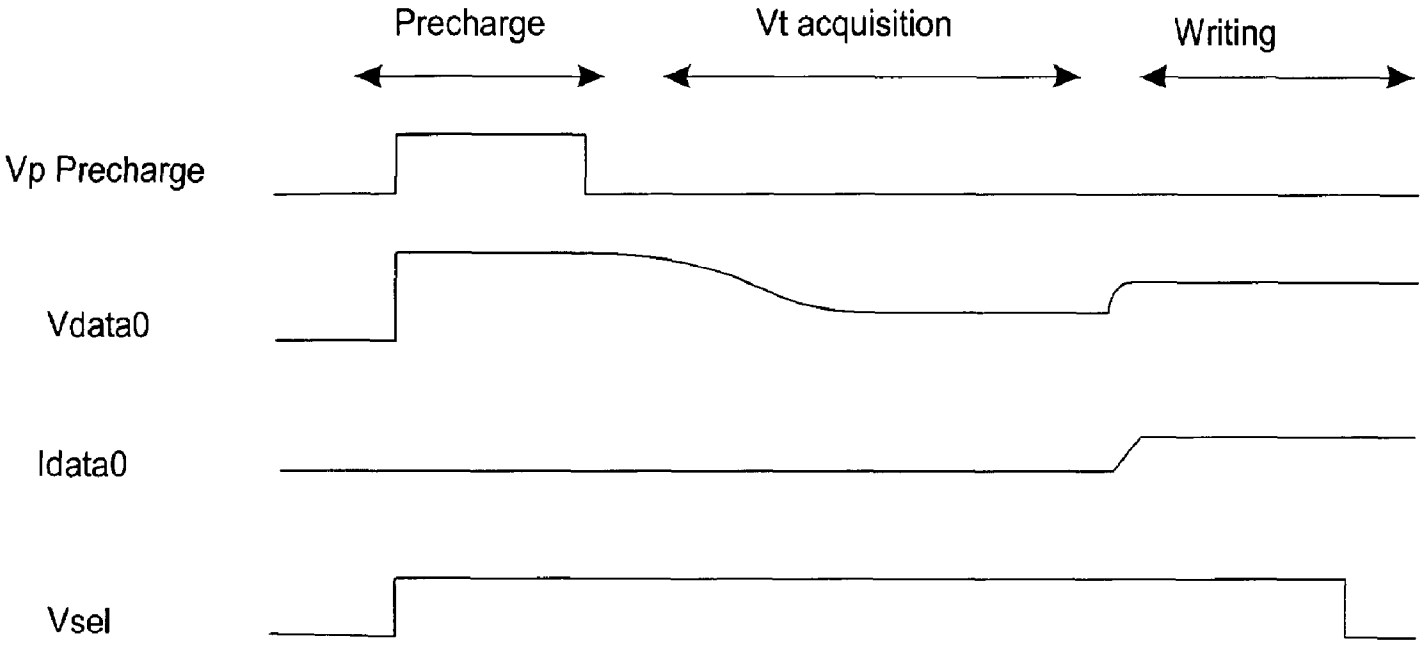
FIG. 5 is an exemplary timing chart for showing the operation of the hybrid driving circuit of FIG. 3.

FIG. 5 illustrates an exemplary timing chart for showing the operation of the hybrid driving circuit 12A of FIG. 3. In the drawings, Vdata0 represents voltage at the data node (e.g. DL of FIG. 2) of the pixel circuit; Idata0 represents current at the data node (e.g. DL of FIG. 2) of the pixel circuit.

The programming procedure starts by selecting the pixel to be programmed with the pulse Vsel. At the same time, the pre-charge pulse Vp is applied to the pixel circuit's data input (e.g. DL of FIG. 2).

During the Vt acquisition phase, voltage on the data line (DL) is allowed to be discharged through the pixel circuit, which is in a current mirror connection with the Vsel line held high. The data line (DL) is discharged to a certain voltage, and the Vt of a drive TFT is extracted from that voltage. The voltage at Vdata is at ground.

During the programming (writing) phase, the calculated compensated voltage is applied to the data input line (DL) of the pixel circuit. The programming routine finishes with the lowering of the Vsel signal.

The calculated compensated voltage is obtained through analog means of a charge programming capacitor Cc32. However, any other analog means for obtaining compensated voltage may be used. Further, any (external) digital circuit (e.g. 50 of FIG. 7) may be used to obtain the calculated compensated voltage.

The source driver (14 of FIG. 1) supplies Vdata to the capacitor Cc 32. When Vdata is increased from ground to the desired voltage level, the voltage at Idata is equal to (Vt+Vdata)*K.

The structure of FIG. 3 is simple, and is easily implemented.

Figure 6:
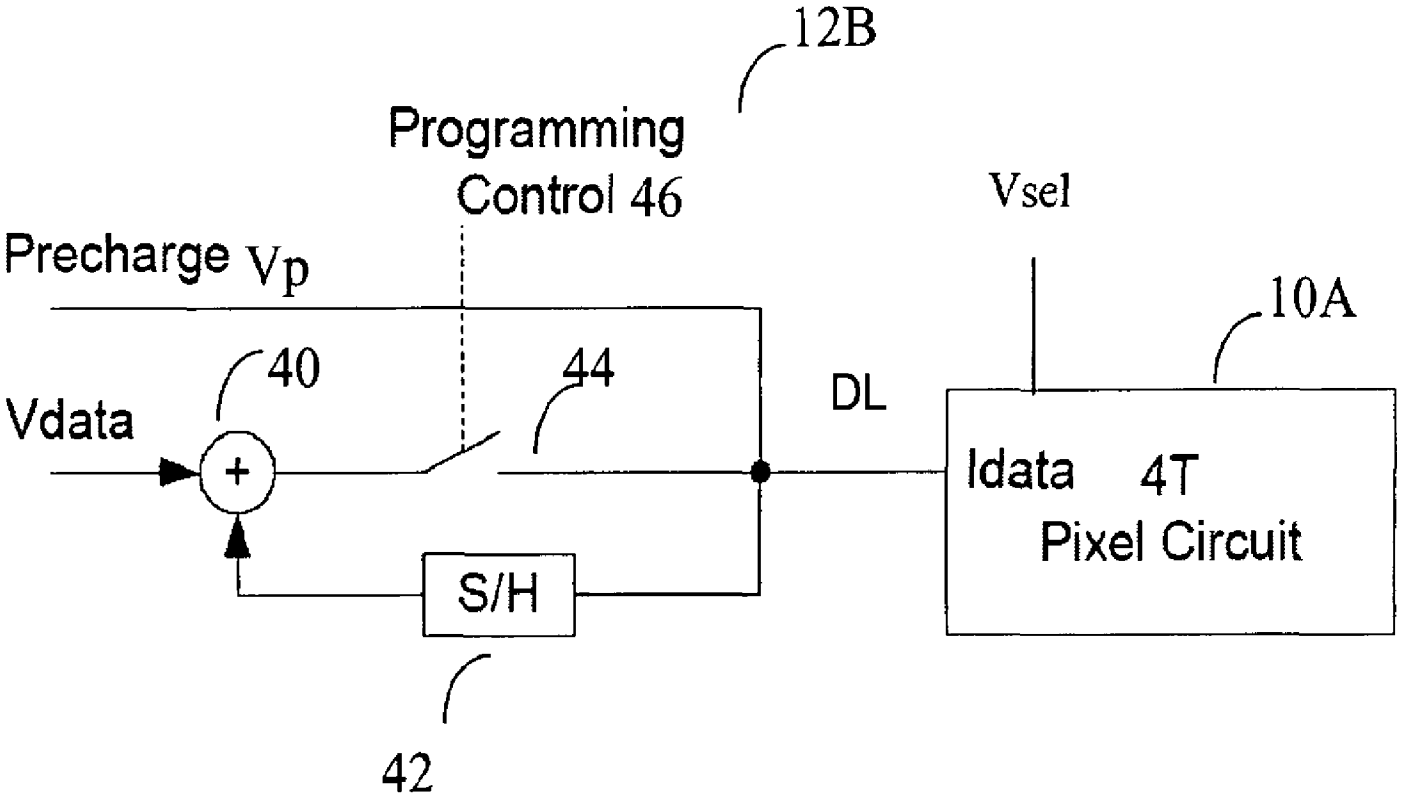
FIG. 6 is a schematic diagram showing a further example of a hybrid driving circuit, which is applicable to FIG. 1.

FIG. 6 illustrates a further example of a hybrid driving circuit, which is applicable to the hybrid driving circuit 12 of FIG. 1. The hybrid driving circuit 12B of FIG. 6 implements voltage programming technique.

The hybrid driving circuit 12B includes a summer 40, a sample and hold (S/H) circuit 42 and a switching element 44. The S/H circuit 42 samples Idata and holds it for a certain period. The summer 40 receives Vdata and the output of the S/H circuit 42. The switching element 44 connects the output of the summer 40 to the data node DL in response to a programming control signal 46.

The hybrid driving circuit 12B utilizes the summer 40, instead of the charge coupling capacitor Cc 32, to produce programming voltage that is equal to the sum of Vt and Vdata. As the hybrid driving circuit 12B does not utilize a capacity, programming voltage is not affected by the parasitic capacitance, and it has less charge feed-through effect. As the hybrid driving circuit 12B does not utilize a charge storage capacitor, programming voltage is not affected by the charge storage capacitance. As the hybrid driving circuit 12B does not utilize a charge programming capacitor, it achieves faster Vt acquisition time. Removal of the charge programming capacitor eliminates the charge dependency of the programming scheme. Thus the programming voltage is not affected by the charge being shared between the charge storage capacitor and the parasitic capacitance of the system. This results in a higher effective programming voltage.

Figure 7:
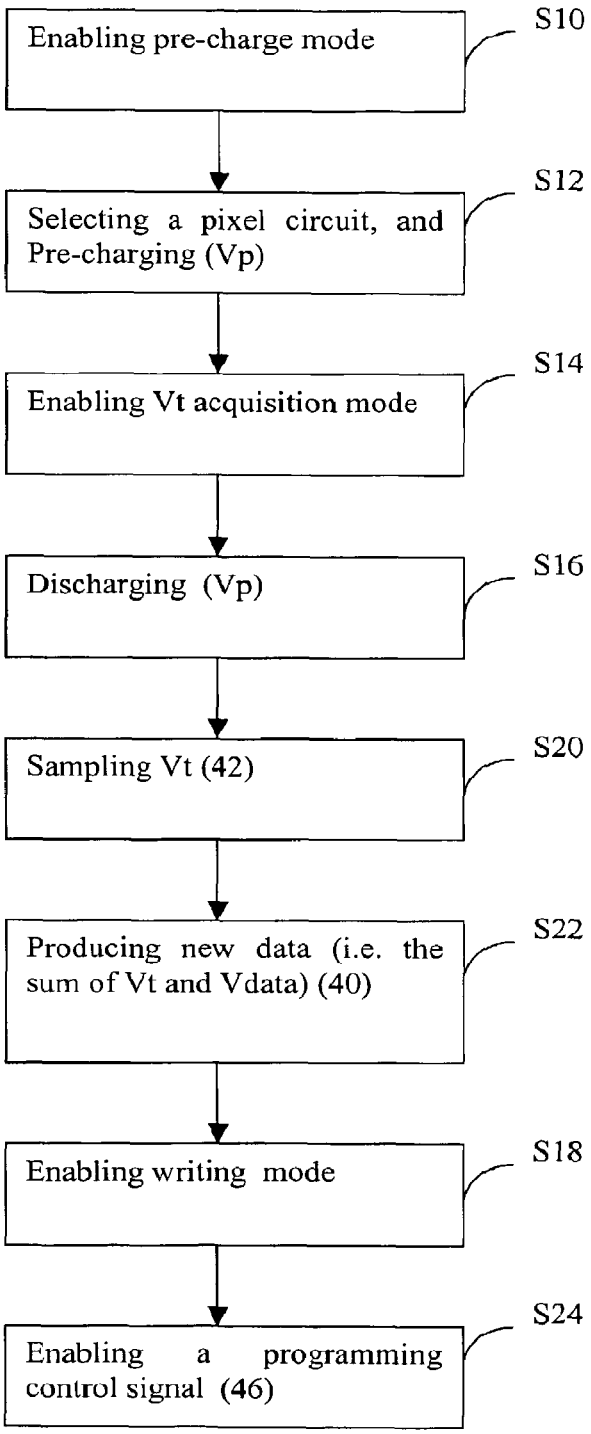
FIG. 7 is an exemplary flow chart for showing the operation of the hybrid driving circuit of FIG. 6.

FIG. 7 illustrates an exemplary flow chart for showing the operation of the hybrid driving circuit 12B of FIG. 6. During the Vt acquisition mode, the Vt is sampled at step S20, and new data is produced at step S22. When writing mode is enabled, the new data is supplied to the pixel circuit in response to the programming control signal (46) at S24. It is noted that the operation of the system having the hybrid driving circuit 12B is not limited to FIG. 7. The new data may be produced after step S18. The control signal 46 may be enabled before step S18.

During the Vt acquisition cycle, Vdata is at ground, and the voltage at the data node DL is equal to Vt of the TFT by the pre-charging/discharging operation (Vp). The voltage on the data node DL is sampled and holed by the S/H circuit 42. The Vt is provided to the summer 40 through the S/H circuit 42. When Vdata is increased from ground to the desired voltage level, the summer 40 outputs the sum of Vt and Vdata. The switch 44 turns on in response to the programming control signal 46. The voltage at the data node DL goes to (Vt+Vdata). Timing chart for showing the operation of the system 2 having the hybrid driving circuit 12B is similar to that of FIG. 5.

Figure 8:
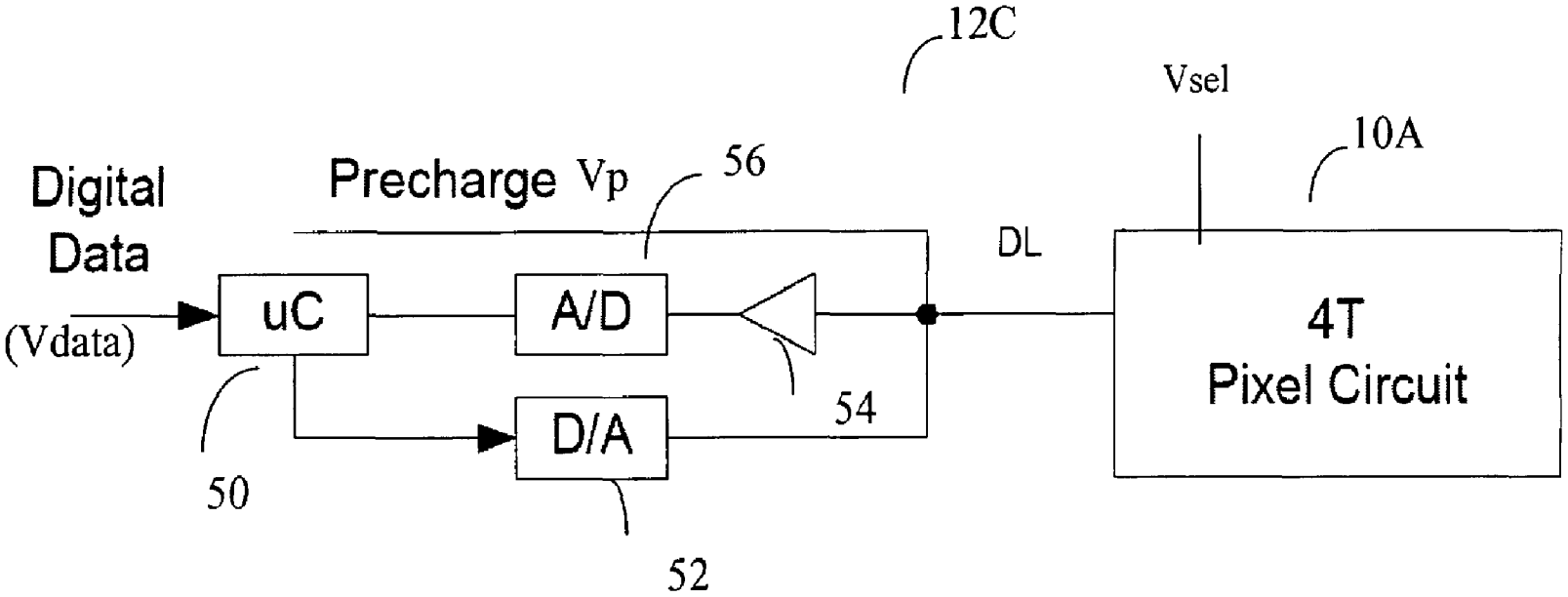
FIG. 8 is a schematic diagram showing a further example of a hybrid driving circuit, which is applicable to FIG. 1.

FIG. 8 illustrates a further example of a hybrid driving circuit, which is applicable to the hybrid driving circuit 12 of FIG. 1. The hybrid driving circuit 12C of FIG. 8 implements voltage programming technique.

The hybrid driving circuit 13C is a direct digital hybrid driving circuit. The direct digital programming circuit 13C includes a microComputer uC 50 which receives digital data (Vdada), a digital to analog (D/A) converter 52, a voltage follower 54 for increasing current without affecting voltage, and an analog to digital (A/D) converter 56.

The threshold Vt of the drive TFT may increase slowly. Thus, it may not be necessary to acquire the threshold Vt of the drive TFT every programming cycle. This effectively hides the Vt acquisition for the majority of the programming cycle. In the direct digital hybrid driving circuit 13C, the threshold Vt acquired from the pixel circuit 10A is digitalized at the A/D converter 56, and is stored in memory contained in the uC 50. The digital data that defines the brightness of the pixel is added to the Vt in the uC 50. The resulting voltage is then converted back to an analog value at the D/A 52, which is programmed into the pixel circuit 10A. This programming method is designed to compensate for the slow process of the Vt acquisition.

Figure 9:
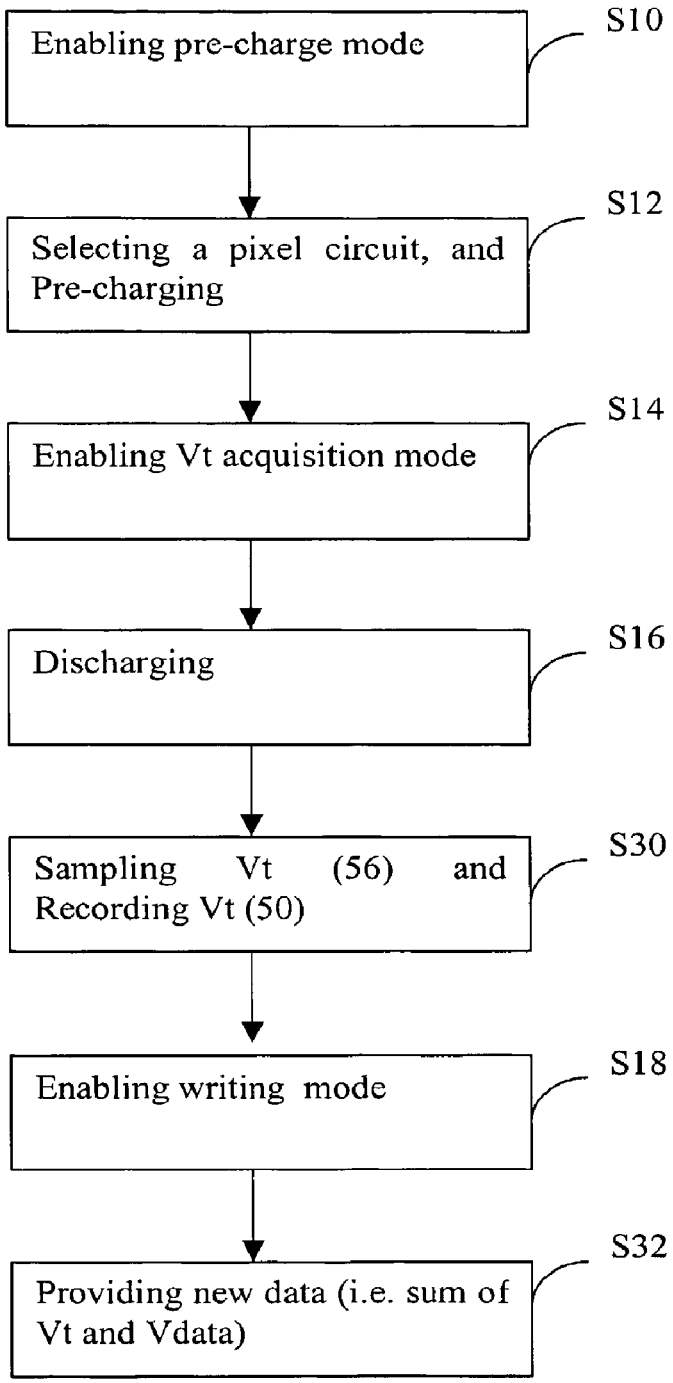
FIG. 9 is an exemplary flow chart for showing the operation of the hybrid driving circuit of FIG. 8.

FIG. 9 illustrates an exemplary flow chart for showing the operation of the hybrid driving circuit 12C of FIG. 8. At the Vt acquisition mode, the Vt is sampled and recorded at step S30. When writing mode is enabled, new data is provided based on the recorded data. It is noted that the operation of the system having the hybrid driving circuit 12C of FIG. 8 is not limited to FIG. 9. At the writing mode, the data which have been recorded may be used without implementing the Vt acquisition.

Figure 10:
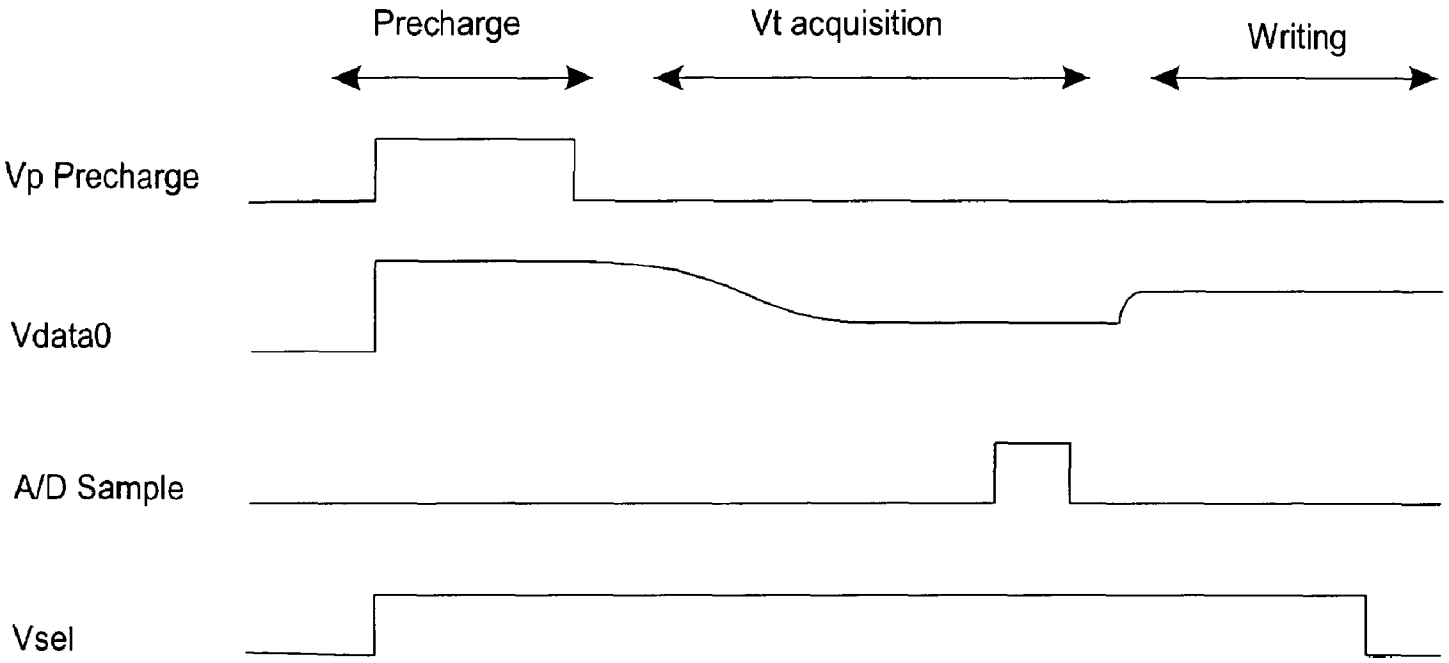
FIG. 10 is an exemplary timing chart for showing the operation of the hybrid driving circuit of FIG. 8.

FIG. 10 illustrates an exemplary timing chart for showing the operation of the hybrid driving circuit 12C of FIG. 8. During the Vt acquisition, sampling by the A/D converter 56 is implemented. In a next cycle, the hybrid driving circuit 13C may use the Vt that has been previously acquired and has been recorded in the uC 50.

The conversion of the output on the data node DL by A/D can remove the requirements of having to acquire the Vt every programming cycle. The Vt of the pixel circuit 10A may be acquired once every second or less. Thus, it may acquire Vt for only one row of the display per frame cycle. This effectively increases the amount of time for the pixel programming cycle. Less frequent need of Vt acquisition ensures faster programming time.

Figure 11:
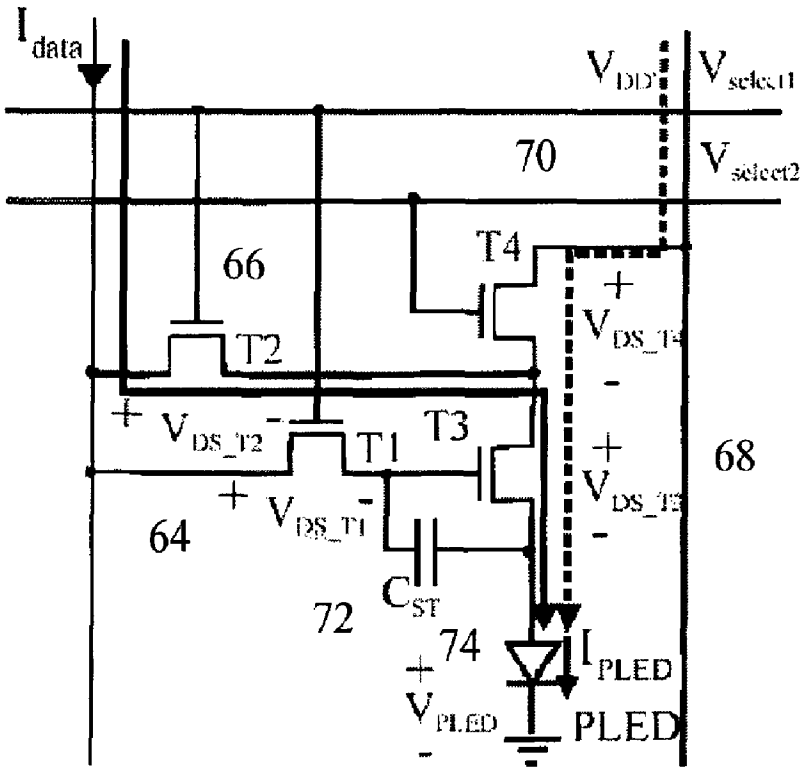
FIG. 11 is a schematic diagram showing a further example of the pixel circuit of FIG. 1.

In the above description, FIG. 2 is used to describe the pixel circuit 10 of FIG. 1. However, the pixel circuit 10 is not limited to that of FIG. 2. The pixel circuit 10 may be a pixel circuit illustrated in FIG. 11 (J. Kanichi, J.-H. Kim, J. Y. Nahm, Y. He and R. Hattori "Amorphous Silicon Thin-Film Transistor Based Active-Matrix Organic Light Emitting Display" Asia Display IDW 2001 pp. 315). The pixel circuit of FIG. 11 includes four TFTs 64-70, a capacitor $C_{ST}$ 72 and an OLED 74. The TFT 78 is a drive TFT that is connected to the OLED 74 and the capacitor $C_{ST}$ 72. The pixel circuit of FIG. 11 is selected by Vselect1 and Vselect2, and is programmed by Idata. The voltage acquired is a combination of the voltage across the OLED 74 and T3 68. The technique compensates the voltage change of both the Vt and the OLED 74. Idata of FIG. 11 corresponds to the data node DL of FIG. 2.

Figure 12:
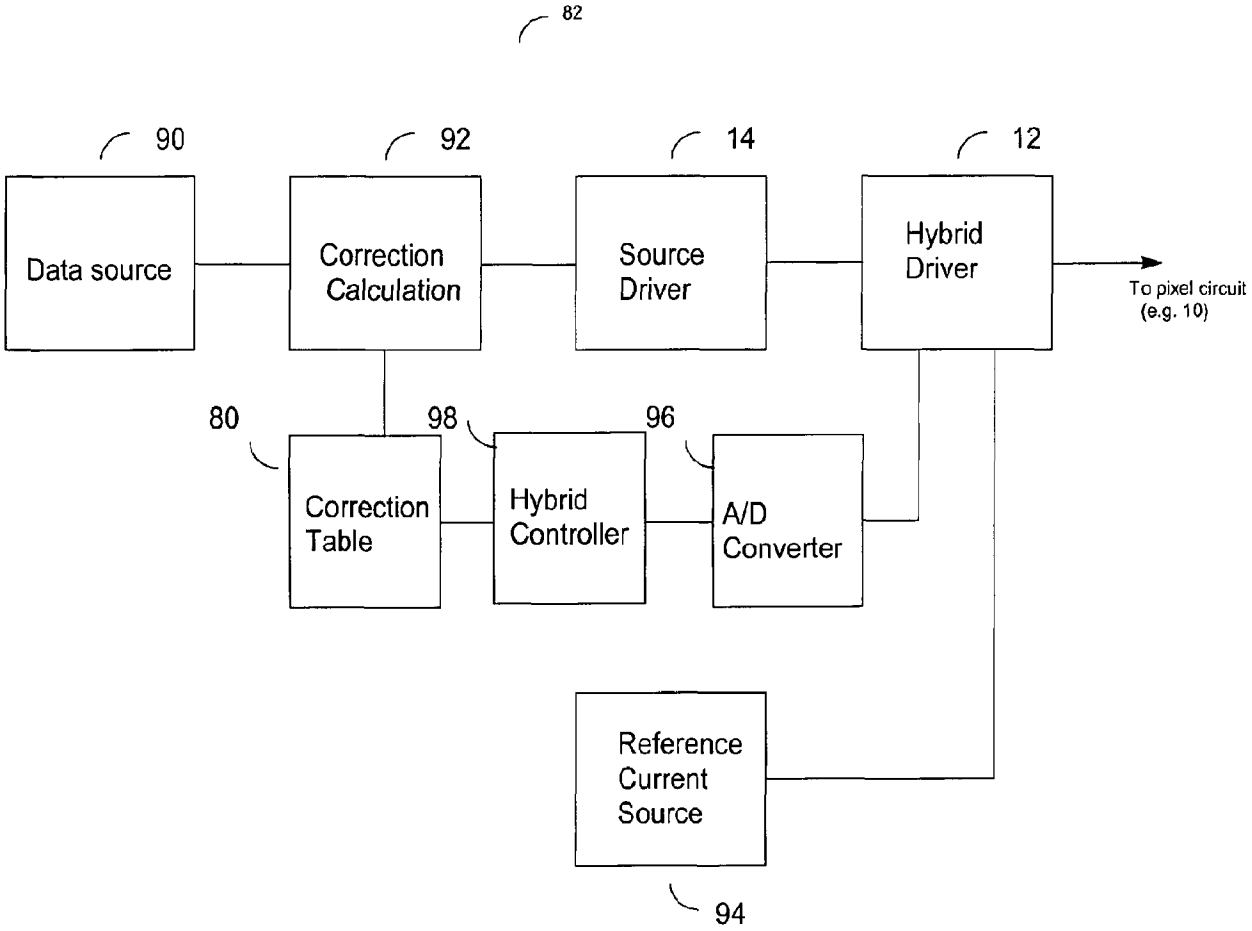
FIG. 12 is a block diagram showing a system for driving an AMOLED display in accordance with a further embodiment of the present invention.

FIG. 12 illustrates a system for driving an AMOLED display in accordance with a further embodiment of the invention. The system 82 of FIG. 12 includes a hybrid programming circuit having a correction table 80, a source driver 14 for implementing a voltage-programming scheme and a reference current source 94 for implementing a current-programming scheme. The system 82 drives a display having a plurality of pixel circuits using the voltage-programming scheme and the current-programming scheme.

A hybrid controller 98 is provided to control each component. In FIG. 12, the hybrid controller 98 is placed between the A/D converter 96 and the correction table 80, as an example. The hybrid controller 98 is similar to the hybrid controller 16 of FIG. 1.

The pixel circuit driven by the system 82 may be the pixel circuit 10 of FIG. 1, and may be a current programmed pixel circuit or a voltage programmed pixel circuit. The pixel circuit driven by the system 82 may be implemented by FIG. 2 or FIG. 11, however, is not limited to those of FIGS. 2 and 11.

The hybrid programming circuit includes a correction calculation module 92 for correcting data from the data source 90 based on the correction table 80 and an A/D converter 96. The data corrected by the correction calculation module 92 is applied to the source driver 14. The source driver 14 generates Vdata based on the corrected data output from the correction calculation module 92. Vdata from the source driver 14 and Idata from the reference current source 94 are supplied to the hybrid driver 12.

The data source 90 is, for example, but not limited to, a DVD. The hybrid driver 12 may be implemented either as a switching matrix, or as the digital programming circuit(s) of FIG. 8, 20 or combination thereof. The A/D converter 96 may be the A/D converter 56 of FIG. 8. The system 82 may implement the Vt acquisition technique described above using the A/D converter 96 (56).

The correction table 80 is a lookup table. The correction table 80 records the relationship between current required to program the pixel circuit and voltage necessary to obtain that current. The correction table 80 is built for every pixel in the entire display.

In the description, the relationship between the current required to program the pixel circuit and the voltage necessary to obtain that programming current, is referred to as "current/voltage correction information", "current/voltage correction curve", or "current/voltage information", or "current voltage curve".

In FIG. 12, the correction table 80 is illustrated separately from the correction calculation module 92. However, the correction table 80 may be included in the correction calculation module 92.

The operation of the system of FIG. 12 has two modes, namely display mode and calibration mode. In the display mode, the data from the data source 90 is corrected using the data in the correction table 80, and is applied to the source driver 14. The hybrid driver 12 is not involved in the display mode. In the calibration mode, the current from the reference current source 94 is applied to the pixel circuit, and the voltage associated with the current is read from the pixel circuit. The voltage is converted to a digital data by the A/D converter 96. The correction table 80 is updated with the correct value based on the digital data.

During the display mode, a voltage-programming scheme is implemented. The voltage on the data line (e.g. DL of FIG. 2) of the pixel circuit determines the brightness of the pixels. The voltage required to program the pixel circuit is calculated from the pixel brightness to be displayed (from the incoming video information) combined with the current/voltage correction information stored in the correction table 80. The information on the correction table 80 is combined with incoming video information to ensure that each pixel will maintain a constant brightness over long-term use.

After the display has been used for a fixed period of time, the display enters the calibration mode. The current source 94 is connected to the data input node (DL) of the pixel circuit via the hybrid driver 12. Each pixel is programmed through a current-programming scheme (where the level of current on the data line determines the brightness of the pixel), and the voltage required to achieve that current is read by the A/D converter 96.

The voltage required to program the pixel current is sampled at multiple current points by the A/D converter 96. The multiple points may be a subset of the possible current levels (e.g. 256 possible levels for 8-bit, or 64 levels for 6-bit). This subset of voltage measurements is used to construct the correction table 80 that is interpolated from the measurement points.

The calibration mode may be entered either through user's command or may be combined with the normal display mode so that the calibration takes place during the display refresh period.

In one example, the entire display may be calibrated at once. The display may stop showing incoming video information for a short period of time while each pixel was programmed with a current and the voltage recorded.

In a further example, a subset of the pixels may be calibrated, such as one pixel every fixed number of frames. This is virtually transparent to the user, and the correction information may still be acquired for each pixel.

When a conventional voltage-programming scheme is utilized, a pixel circuit is programmed in an open loop configuration, where there is no feedback from the pixel circuit regarding the threshold voltage shift of the TFTs. When a conventional current-programming scheme is utilized, the brightness of the pixel may remain constant over time. However, the current programming scheme is slow. Thus, the table lookup technique combines the technique of the current-programming scheme with the technique of the voltage-programming scheme. The pixel circuit is programmed with a current through a current-programming scheme. A voltage to maintain that current is read and is stored at a lookup table. The next time that particular level of current is applied to the pixel circuit, instead of programming with a current, the pixel circuit is programmed based on information on the lookup table. Accordingly, it attains the compensation inherent in the current programming scheme while attaining the fast programming time that is only possible with voltage-programming scheme.

In the above description, the correction table (lookup table) 80 is used to correct the current/voltage correction information. However, the system 82 of FIG. 12 may use the lookup table to correct the Vt shift and the current/voltage correction information at the same time in combination with the hybrid driving circuit of FIG. 3, 6, 8 or 20.

For example, several voltage measurements are captured at many different current points by the A/D converter 96 (56). The hybrid controller 98 extracts the Vt shift information by extending the voltage versus current curve to zero current point. The Vt shift information is stored in an array of tables (correction table 80) which is applied to incoming display data.

Figure 20:
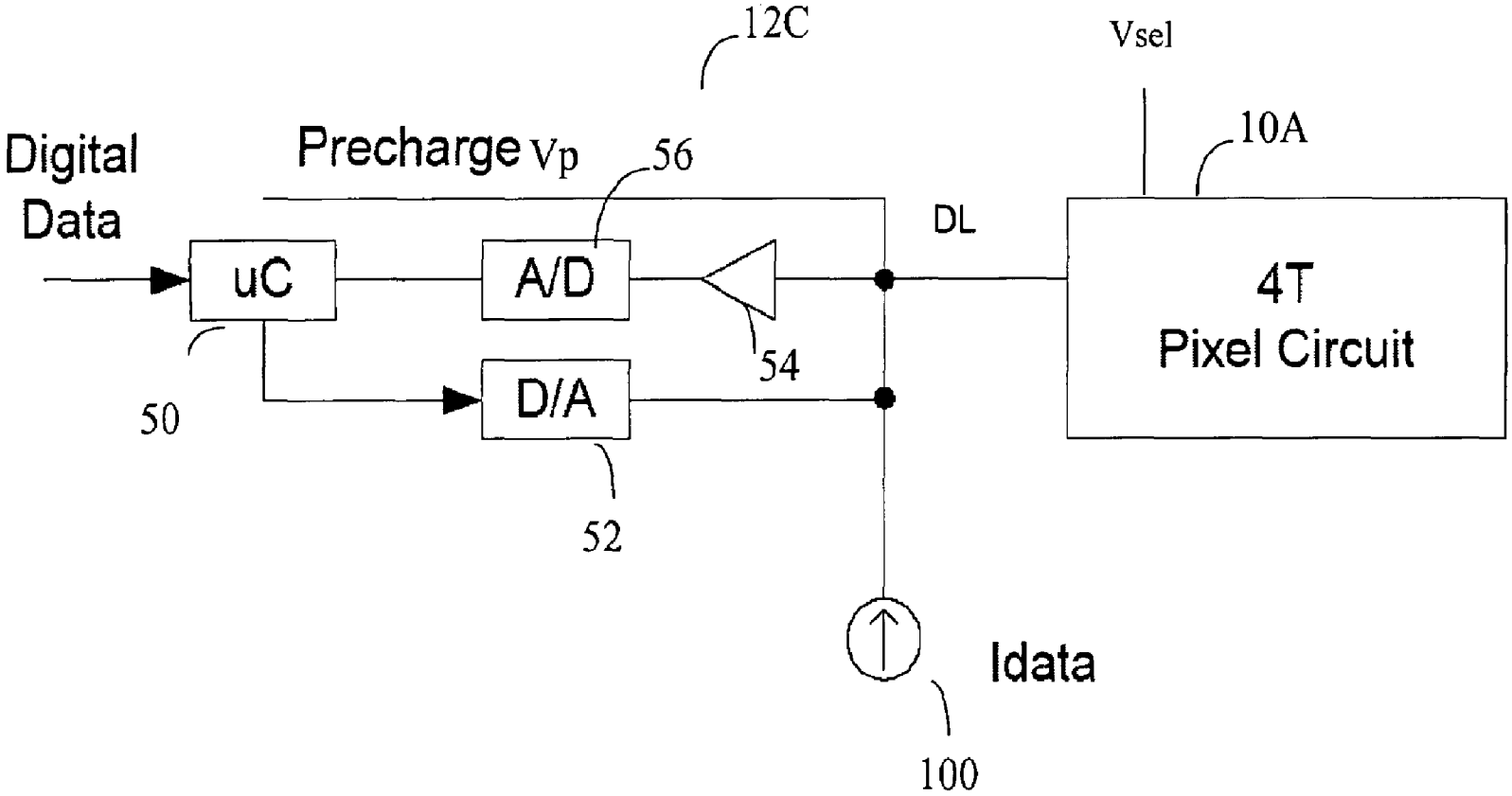
FIG. 20 is a block diagram showing a further example of a programming circuit for implementing a combined current and voltage-programming technique.

The uC 50 of FIG. 8 or 20 may utilize the lookup table to generate appropriate voltage and program the pixel circuit.

The hybrid circuits 12A of FIGS. 3 and 12B of FIG. 6 may be integrated into the system of FIG. 12.

Figure 13:
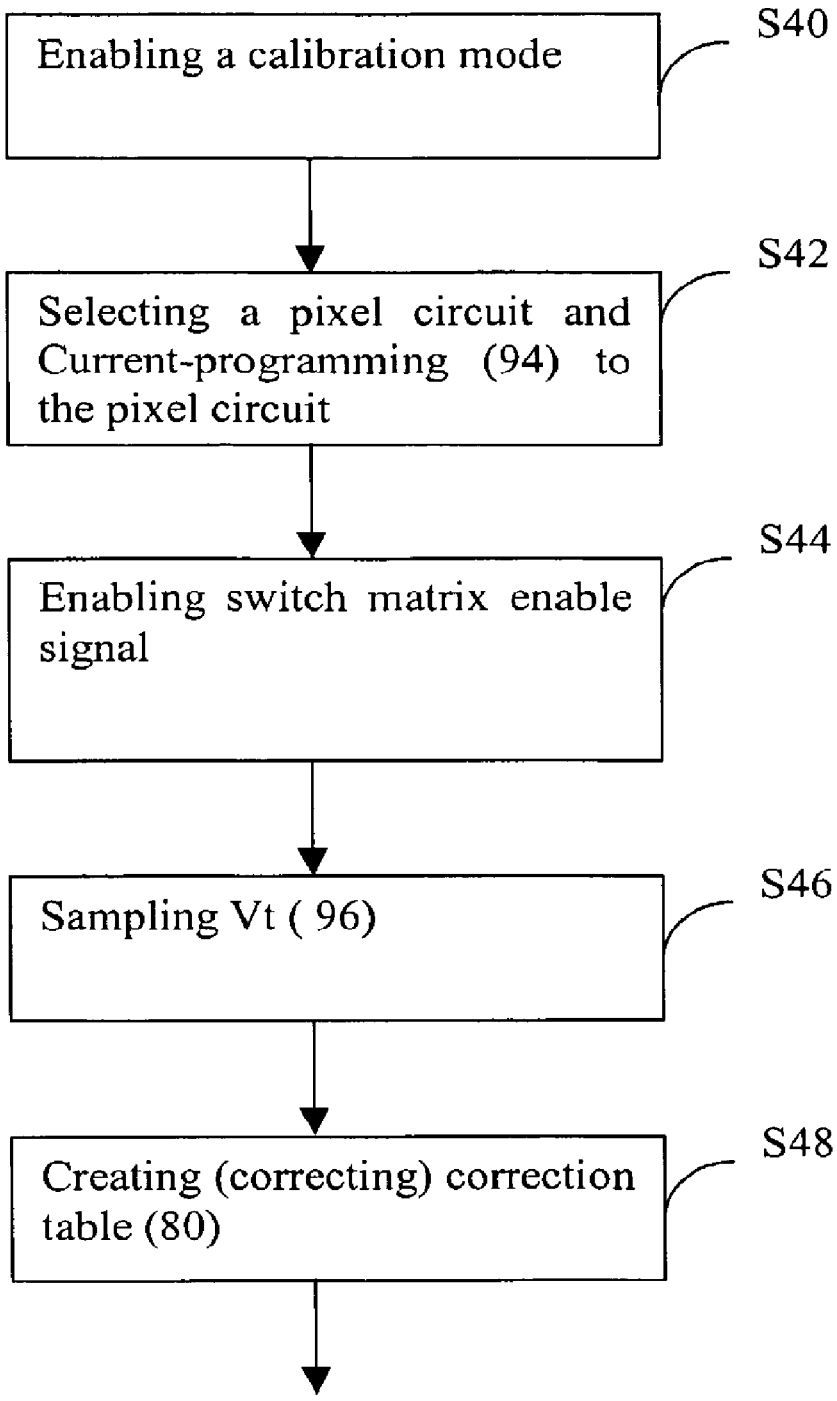
FIG. 13 is an exemplary flow chart for showing the operation of the system of FIG. 12.
Figure 14:
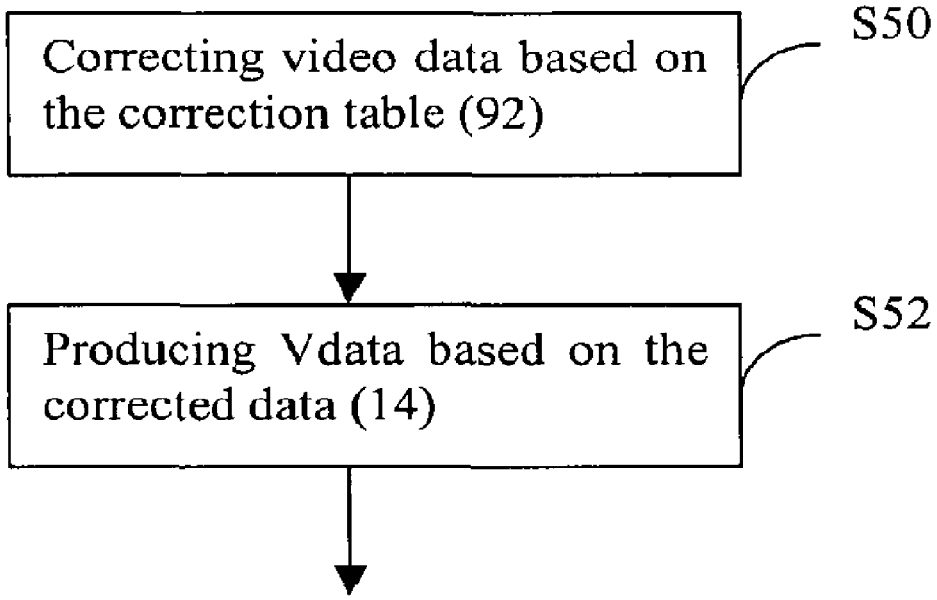
FIG. 14 is an exemplary flow chart for showing the operation of the system of FIG. 12.

FIGS. 13-14 illustrate exemplary flow charts for showing the operation of the system of FIG. 12. Referring to FIG. 13, at step S40, calibration mode is enabled. At step S42, a pixel circuit is selected and current programming is implemented to the selected pixel circuit. At step S44, a switch matrix enable signal is enabled. Then the connection to the pixel circuit is changed. The Vt is sampled at step s46, and then the correction table is created/corrected at step S48. Referring to FIG. 14, at step S50, video data are corrected based on the correction table. Then at step S52, new Vdata is produced based on the corrected data.

It is noted that the writing mode may be implemented based on the previously created correction table without implementing the calibration mode. It is noted that the operation of the system of FIG. 12 is not limited to FIGS. 13-14.

Figure 15:
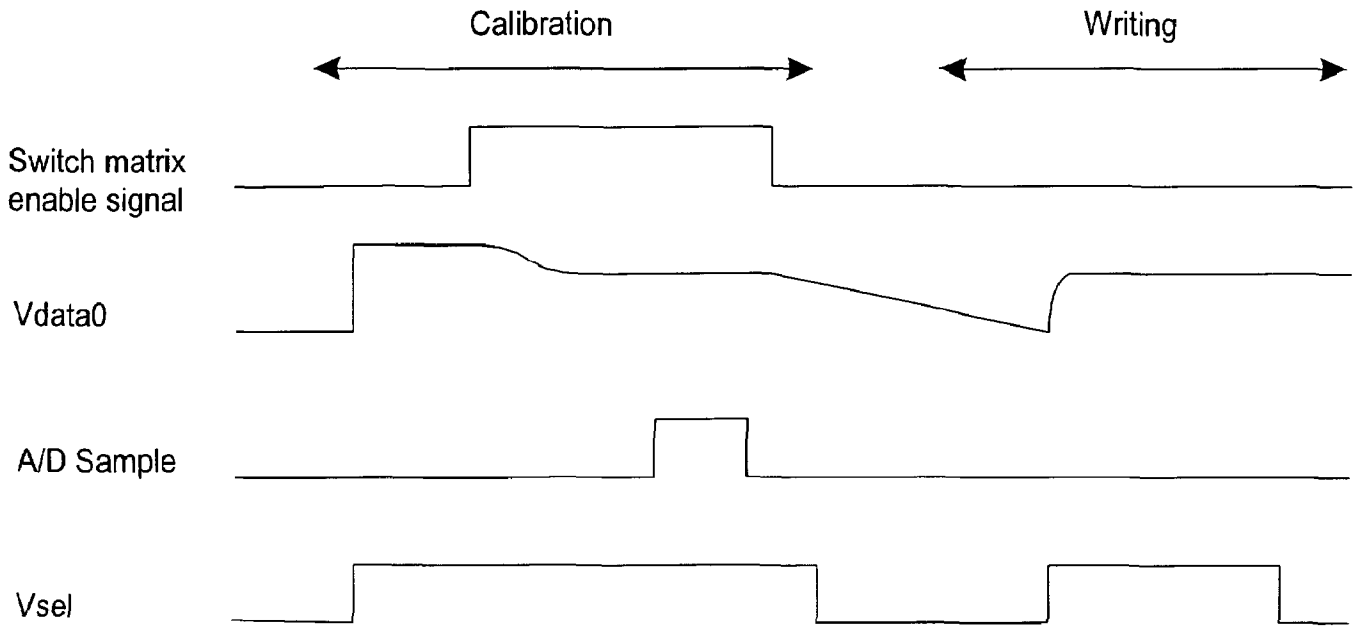
FIG. 15 is an exemplary timing chart for showing the operation of the system of FIG. 12.

FIG. 15 illustrates an exemplary timing chart for showing a combination of the Vt shift acquisition and the current/voltage correction. A switch matrix enable signal in FIG. 15 represents a control signal for the hybrid driver 12 of FIG. 12.

Referring to FIGS. 12 and 15, the calibration mode (i.e. the current-programming scheme) is enabled when the switch matrix enable signal is high. The programming mode (i.e. the voltage-programming scheme) is enabled when the switch matrix enable signal is low. However, the calibration mode may be enabled when the switch matrix enable signal is low. The programming mode may be enabled when the switch matrix enable signal is high.

A/D sampling is implemented during the calibration mode. During the calibration mode, the current from the reference current source 94 is applied to the pixel circuit. The voltage on the data input node is converted to a digital voltage by the A/D converter 56. Based on the digital voltage and current associated with the digital voltage, current/voltage correction information is recorded at the lookup table. The Vt shift information is generated based on the data in the correction table 80 or the output from the A/D converter 96.

The system 82 of FIG. 12 may implement hidden refresh technique for refreshing current/voltage correction information in addition to the table lookup technique described above.

Under the hidden refresh operation, new current/voltage correction information is constructed while completely hidden from user's perception. This technique utilizes the information that is currently displayed on the screen (i.e. the incoming video data). By obtaining the pixel characteristics from the full calibration routine that has been performed during the manufacturing process of the display, the current/voltage correction information for each pixel in the display is known. During the display's usage, the current/voltage correction curve may shift due to the change in Vt. By measuring a single point along the current/voltage correction curve (which is the data currently displayed, that is part of the video image), a new current/voltage correction curve is extrapolated from the point so that it is fitted to the measured point. Based on the new current/voltage correction curve, the Vt shift information is extracted which is used to compensate for the shift in Vt.

Figure 16:
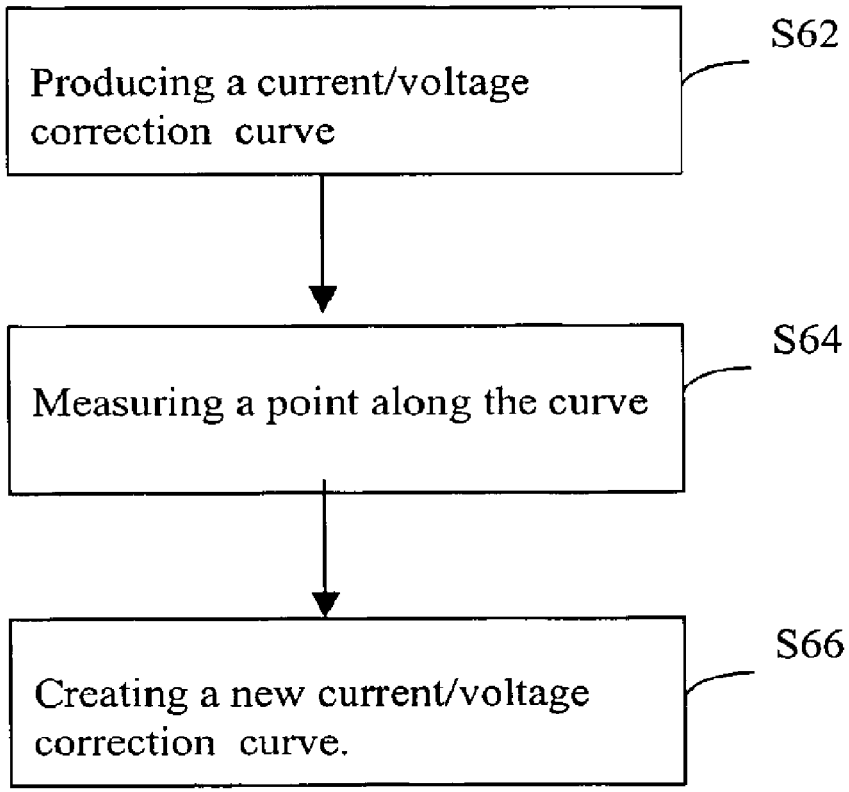
FIG. 16 is an exemplary flow chart for a hidden refresh operation of the system of FIG. 12.
Figure 17:
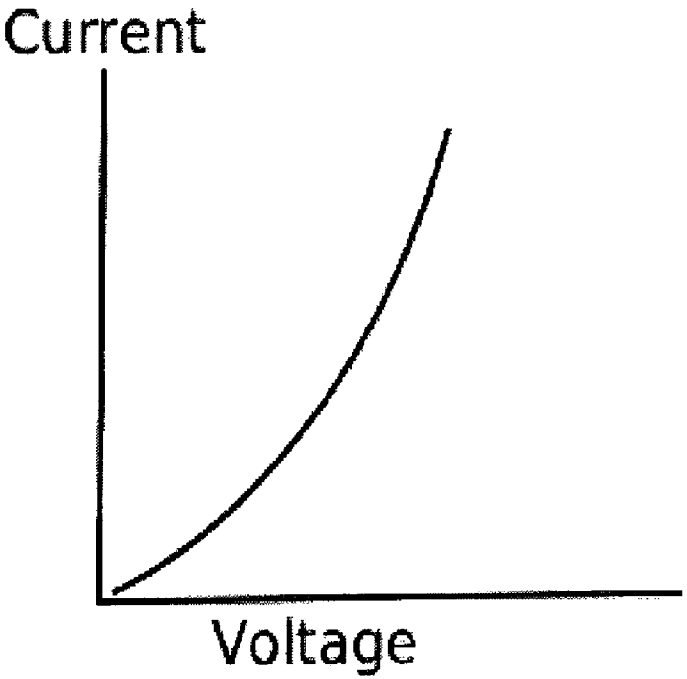
FIG. 17 is a diagram showing an example of a sample of the current/voltage correction curve.

FIG. 16 illustrates an exemplary flow chart for the hidden refresh operation of the system of FIG. 12. First, a current/voltage correction curve is produced during the calibration process that is implemented during the manufacturing of the display (step S62). FIG. 17 illustrates an example of a sample of the current voltage correction curve.

Figure 18:
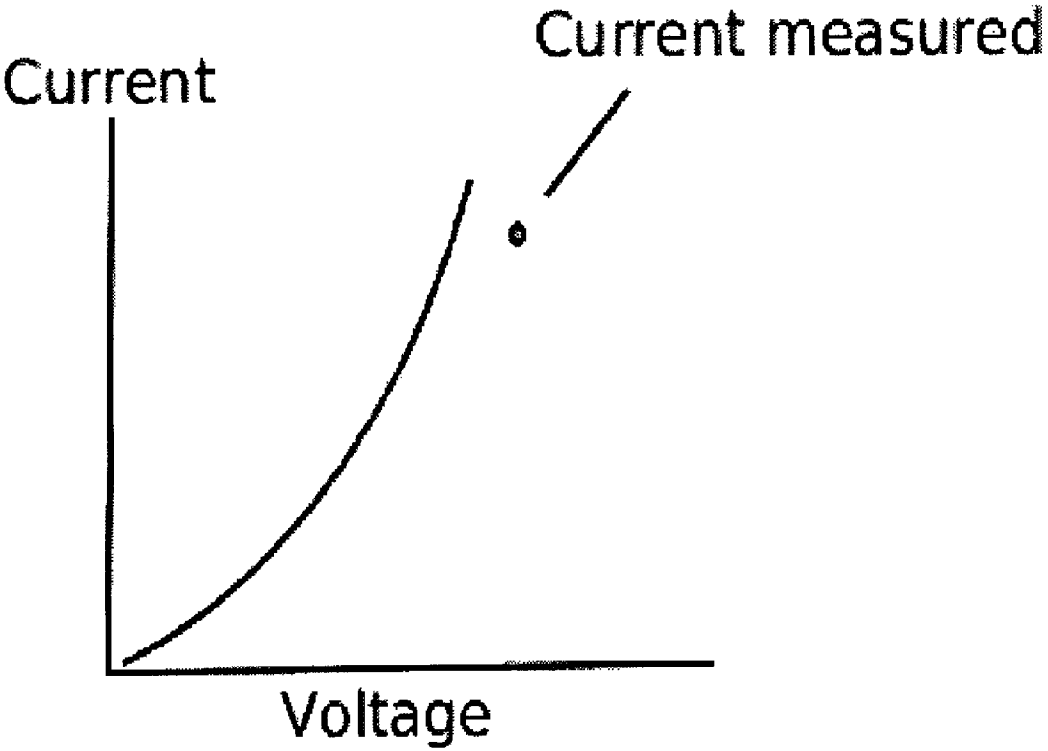
FIG. 18 is a diagram showing the current/voltage correction curve of FIG. 17 and an example of a newly measured data point.

Referring to FIG. 16, the next step is to measure a point along the curve during the usage of the display. This point can be any point along the curve, so any data that the user currently has on the display can be used for calibration (step S64). FIG. 18 illustrates the current voltage correction of FIG. 17 and an example of a newly measured data point.

Figure 19:
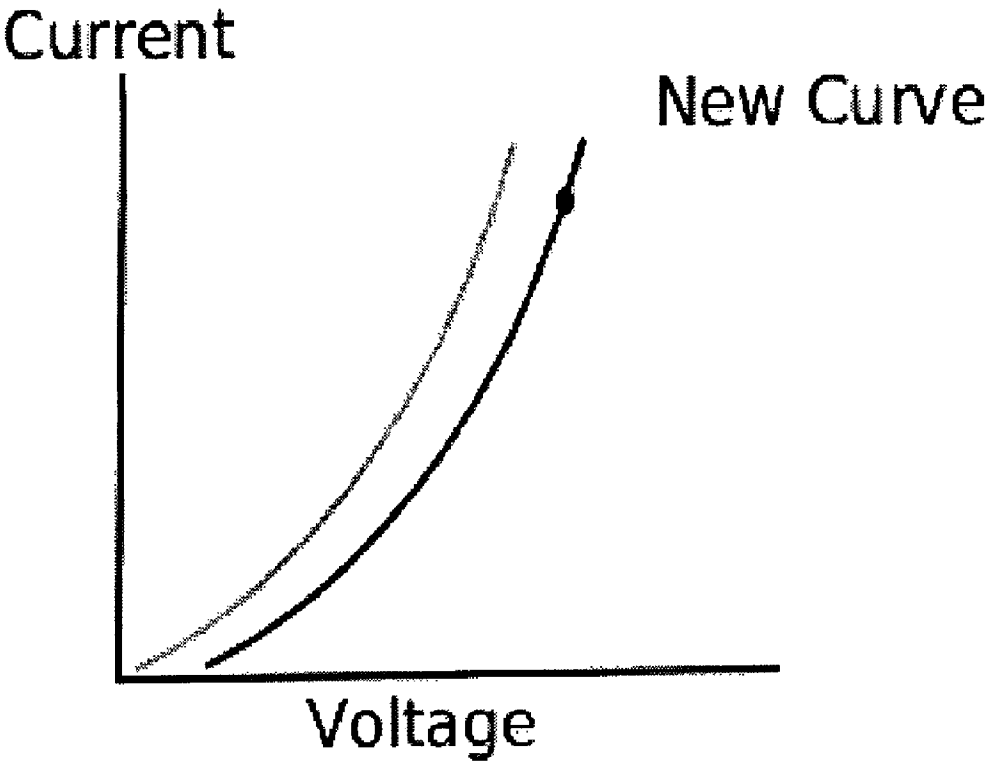
FIG. 19 is a diagram showing an example of a new current/voltage correction curve based on the measured point of FIG. 18.

Referring to FIG. 16, the last step is to shift the current/voltage correction curve to fit the point of voltage verses current relationship that is measured (step S66). FIG. 19 illustrates an example of a new current voltage correction curve based on the measured point of FIG. 18.

The process associated with FIGS. 17-19 is implemented in the hybrid controller 98 of FIG. 12.

The system 82 of FIG. 12 may implement a combined current and voltage-programming technique. FIG. 20 illustrates one example of a hybrid driving circuit for implementing the combined current and voltage-programming technique. The hybrid driving circuit of FIG. 20 may be included in the hybrid driver 12 of FIG. 12.

In the hybrid driving circuit of FIG. 20, the digital hybrid driving circuit 12C and a current source 100 are provided to the data line DL of the pixel circuit.

To enhance the circuit's ability to compensate for a change in the current/voltage correction curve due to temperature, threshold voltage shift, or other factors, the pixel circuit programming is divided into two phases.

During the writing mode, the pixel circuit 10A is voltage-programmed first to set the gate voltage of the driving TFT to an approximate value, then followed by a current programming phase. The current programming phase can then fine-tune the output current. The system of FIG. 20 is faster than current programming and has the compensation capabilities of the current programming scheme.

In FIG. 20, the digital hybrid driving circuit 12C is provided. However, the combined current and voltage-programming technique may be implemented by combining the hybrid driving circuit 12A of FIG. 3 or 12B of FIG. 6 with the current source 100. The current source 100 may be the reference current source 94 of FIG. 12.

The system 2 of FIG. 1 may implement the hidden refresh technique described above. The system 2 of FIG. 1 may implement the combined current and voltage-programming technique. The system 2 of FIG. 1 may include the hybrid driving circuit of FIG. 20 to implement the combined current and voltage-programming technique.

Extension of the direct digital programming scheme is now described in detail. The direct digital programming scheme (FIGS. 6, 8 and 20) can be extended to drive an OLED array (e.g. a 4T OLED array) using voltage programmed column drivers, such as those used for driving Active Matrix Liquixd Crystal Display (AMLCD), or voltage-programmed Active-Matrix Organic Light Emitting Diode (AMOLED) displays, or any other voltage-output display driver.

Figure 21:
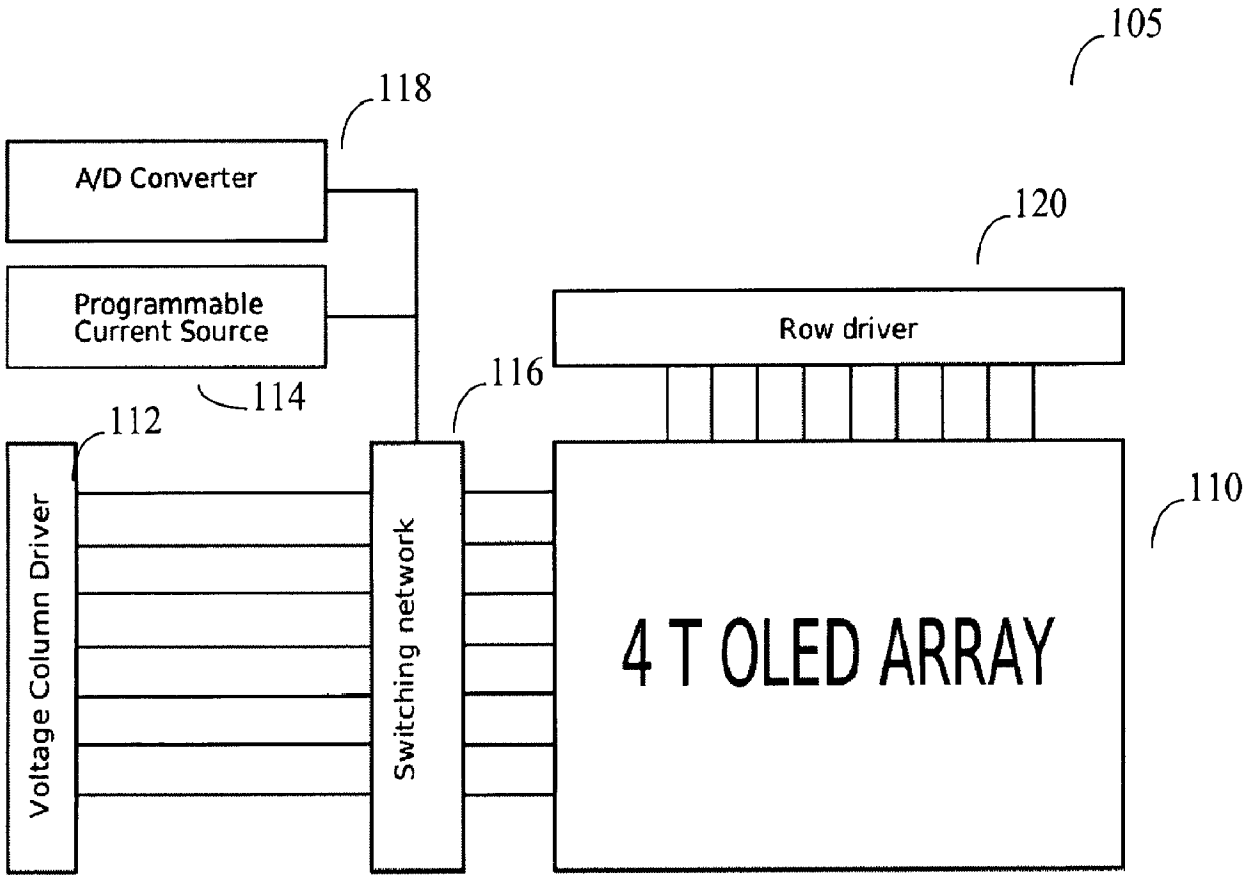
FIG. 21 is a block diagram showing a system for driving an AMOLED display in accordance with a further embodiment of the invention.

FIG. 21 illustrates a system for driving an AMOLED array having a plurality of pixel circuits in accordance with a further embodiment of the invention. The system 105 of FIG. 21 includes a voltage column driver 112, a programmable current source 114, a switching network 116, an A/D converter 118 and a row driver 120.

The voltage column driver 112 is a voltage programmed column driver. Each of the voltage column driver 112 and the row driver 120 may be any driver that has a voltage output, such as those designed for the AMLCD. The voltage column driver 112 and the programmable current source 114 are connected to an OLED array 110 through the switching network 116. The OLED array 110 forms an AMOLED display, and contains a plurality of pixel circuits (such as 10 of FIG. 1). The pixel circuit may be a current programmed pixel circuit or a voltage programmed pixel circuit.

The A/D converter 118 is an interface that allows an analog signal (i.e. current driving the display 110) to be read back as a digital signal. The digital signal associated with the current can than be processed and/or stored. The A/D converter 118 may be the A/D converter 56 of FIGS. 8 and 20. The column driver 112 may be the source driver 14 of FIGS. 1 and 12.

The system 105 of FIG. 21 implements the calibration mode and the display mode as described above.

Figure 22:
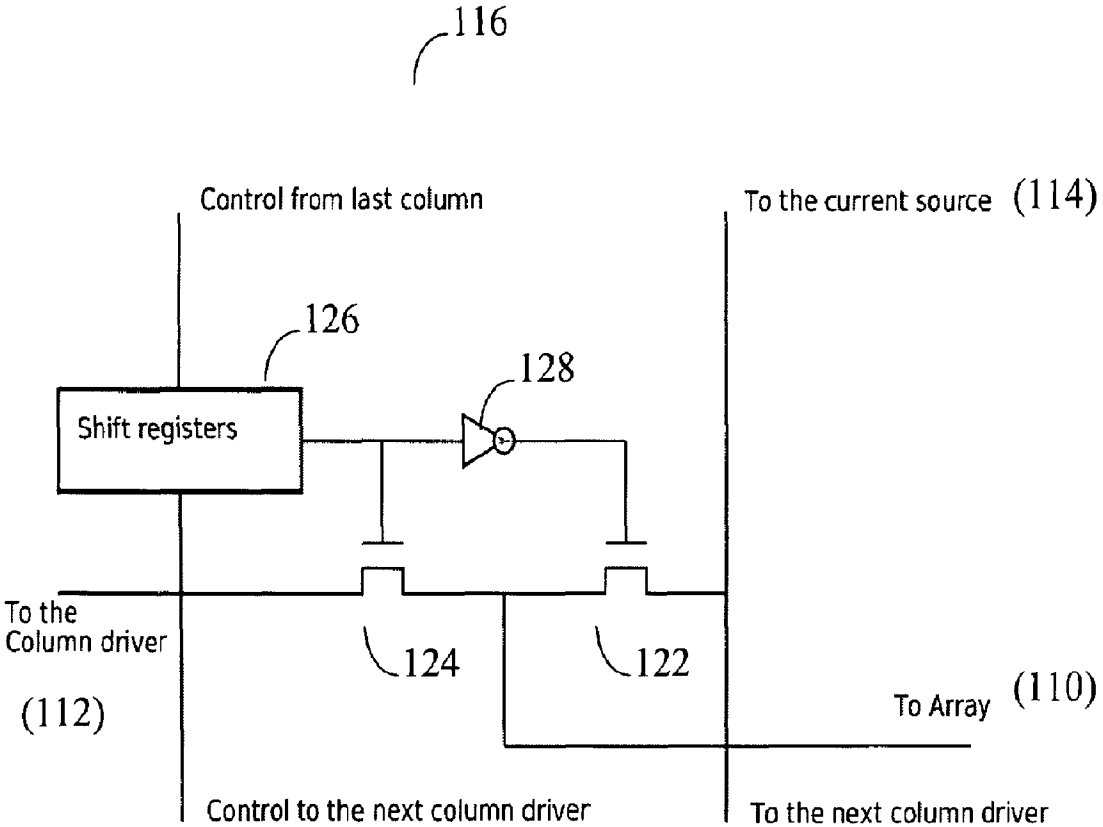
FIG. 22 is a schematic diagram showing an example of a switch network of FIG. 21.

FIG. 22 illustrates an example of the switch network 116 of FIG. 21. The switching network 116 of FIG. 22 includes two MOSFET switches 122 and 124 that can switch the column of the display (110) from connecting to the column driver (112) to the combination of the current source (114) and the A/D converter (118), and vice versa. A shift register 126 is a source of the digital control signal that controls the operation of the MOS switches 122 and 124. An inverter 128 inverts an output from the shift register 126. Thus, when the switch 122 is on (off), the switch 124 is off (on).

The switching network 116 may be located either off the glass in the column driver (112) or directly on the glass using TFT switches.

Referring to FIGS. 21-22, the system 105 uses only one current source 114. The voltage-programming drivers (such as, AMLCD drivers, or any other voltage-output drivers) drive the rest of the display 110. The switching matrix (switching network 116) allows different pixels within the array of pixels to be connected to a single current source (114) through a time division method. This allows a single current source to be applied to the entire display. This lowers the cost of the driver circuit and speeds up the programming time for the pixel circuit.

The system 105 uses the A/D converter 118 to convert an analog output of the data node (e.g. DL of FIG. 2) of the pixel circuit to digital data. The conversion by the A/D converter 118 removes the requirements of having to acquire the Vt every programming cycle. The Vt of the pixel circuit may be acquired once every few minutes. Thus it may acquire one column of the panel every refresh cycle.

Only one A/D 118 may be implemented for all the columns. The circuit acquires only one pixel per frame refresh. For example, for a 320 by 240 panel, the number of pixels is 76, 8000. For a frame rate of 30 Hz, the time required to acquire Vt from all pixels for the entire frame is 43 minutes. This may be acceptable for some applications, providing that Vt does not shift substantially in an hour.

The parasitics only affect the amount of time to discharge the capacitor to acquire Vt. Since the circuit is voltage-programmed, it is not affected by the parasitics. Since Vt is only acquired one column per frame time, it can be long. For example, for a display with 320 columns that has a frame rate of 30 Hz, each frame time is 33 mS. For voltage programming, it is possible to program a pixel in 70 uS. For 320 columns, the time to update the display is 22 mS, which still leave 11 mS to complete a charge/discharge cycle.

The system 105 may implement the lookup table technique to compensate for Vt shift and/or to correct the current/voltage information as described above The system 105 may implement the hidden refresh technique to acquire the Vt shift information and current/voltage correction information of each pixel circuit (10) in the display 110. This current/voltage correction information is used to populate a lookup table (e.g. a correction table 80 of FIG. 12) that will then be used to compensate for the degradation in the pixel circuit, which is caused by aging. To reduce cost, the number of current-programmed circuits has been reduced so there is only one per display instead of one per column driver.

The system 105 may implement the combined current and voltage-programming technique as described above.

Figure 23:
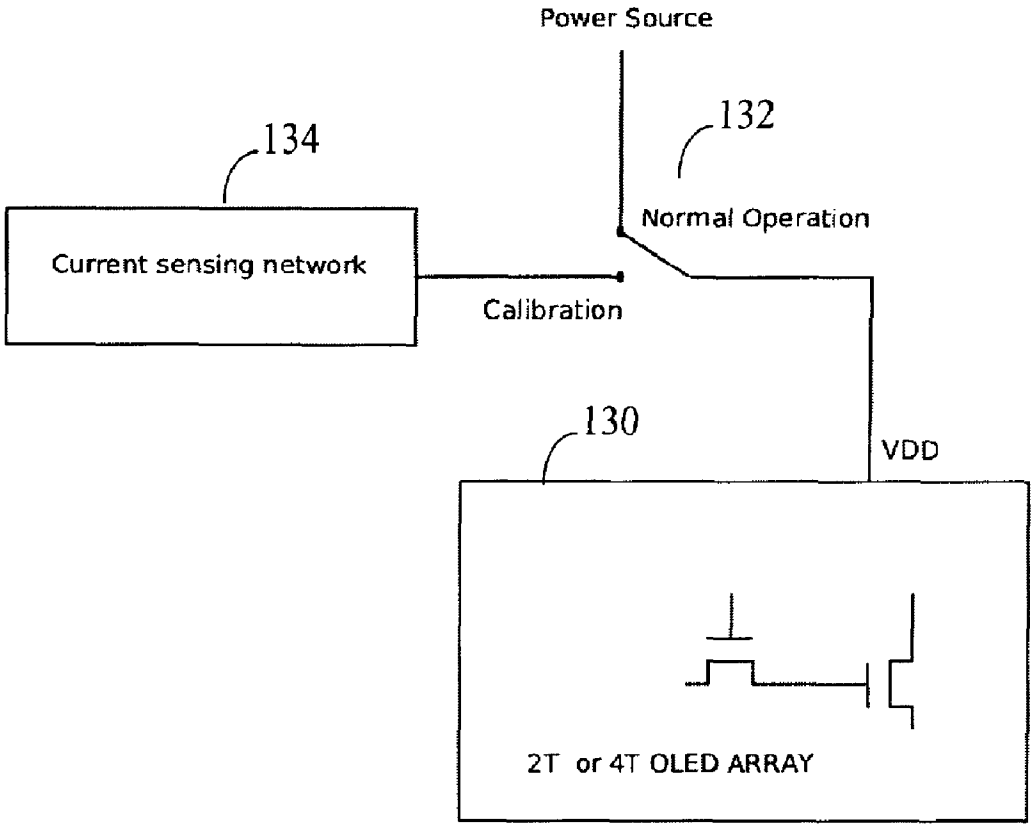
FIG. 23 is a schematic diagram showing a system for correcting the current/voltage information of the pixel circuit.

The current/voltage information of the pixel circuit can be further corrected by implementing a system illustrated in FIG. 23. FIG. 23 illustrates a system for correcting the current/voltage information of the pixel circuit. In FIG. 23, a display 130 is depicted as a 2T or 4T OLED array. However, the display 130 may include a plurality of pixel circuits, each having three or more than four transistors. The display 130 may include voltage-driven pixel circuits or current-driven pixel circuits. The system of FIG. 23 is applicable to the systems 2, 82 and 105 of FIGS. 1, 12 and 22.

As illustrated in FIG. 23, a switch 132 is provided to disconnect the common electrode of the OLED. It is well known that two electrodes are provided for the OLED. One is connected to the pixel circuit, and the other is a common electrode connected to all OLEDs. It is noted that the common electrode may be Vdd or GND depending on the type of OLED. The switch 132 connects the common electrode of the OLED into a current sensing network 134 utilizing a high side common mode sensor (such as, INA168 by TI). The current sensing network 134 measures the current through the common electrode.

During the calibration phase, each pixel is lit individually and the current consumed is acquired by the sensing network 134. The acquired current is used to correct the lookup table (e.g. the correction table 80 of FIG. 12) populated by the direct digital hybrid driving circuit of FIG. 8 or 20.

A dark display current may be acquired to include the effect of dead pixel and leakage current of the array. During this procedure, all pixels are turned off, and the current (i.e. dark display current) is measured.

According to the embodiments of the present invention, the major issue with current-programmed pixel circuits, which is the slow programming time, is solved. The concept of using feedback to compensate the pixel circuit enhances the uniformity and stability of the display while retaining the fast programming capability of the voltage programmed drive scheme.

The present invention has been described with regard to one or more embodiments. However, it will be apparent to persons skilled in the art that a number of variations and modifications can be made without departing from the scope of the invention as defined in the claims.

What is claimed is:

1. A system for programming at least one pixel circuit in a display, the system comprising:

a [voltage] driver for generating a *current or a* voltage to apply to a data node of the at least one pixel circuit to thereby program the at least one pixel circuit according to the generated *current or* voltage;

a programmable current source for providing a first current and a second current to apply to the data node of the at least one pixel circuit;

a sampler for reading a first voltage on the data node while the first current is maintained through the at least one pixel circuit via the programmable current source and for reading a second voltage on the data node while the second current is maintained through the at least one pixel circuit via the programmable current source; and a controller configured to:

generate a voltage versus current relationship for the at least one pixel circuit based on the first current and the second current and based on the sampled first and second voltages, extract, based on the voltage versus current relationship for the at least one pixel circuit, a voltage corresponding to a zero current level, and program the at least one pixel circuit via the data node with a programming *current or* voltage generated by the [voltage] driver that is set according to display data and according to the extracted voltage corresponding to the zero current level.

2. The system according to claim 1, wherein the at least one pixel circuit is configured to be alternately programmed by a programming current applied to the data node or by a programming voltage applied to the data node.

3. The system according to claim 2, wherein the at least one pixel circuit includes a mirror transistor having a gate coupled to a gate terminal of [the] *a* driving transistor, the at least one pixel circuit configured such that the data node is coupled to a gate terminal of the mirror transistor via one or more switch transistors, the applied current being conveyed via the one or more switch transistors through the mirror transistor while the gate terminal of the mirror transistor adjusts to a voltage for maintaining the applied current through the mirror transistor.

4. The system according to claim 3, wherein the one or more switch transistors include a first switch transistor and a second *switch* transistor, the first switch transistor operated according to a select signal and configured to couple the data node to the gate terminal of the mirror transistor while the first switch transistor is switched on, the second switch transistor operated according to the select signal and configured to couple the data node to a drain or a source terminal of the mirror transistor while the second switch transistor is switched on.

5. The system according to claim 2, wherein the at least one pixel circuit includes one or more switch transistors configured to couple the data node to a drain or a source terminal of [the] *a* driving transistor while the programming current is applied to the at least one pixel circuit via the data node, the one or more switch transistors further configured to couple the data node to a gate terminal of the driving transistor while the programming current is applied, such that the gate terminal of the driving transistor adjusts to a voltage for maintaining the applied current through the driving transistor, the one or more switch transistors further configured to couple the data node to [a] *the* gate terminal of the driving transistor while the programming voltage is applied to the at least one pixel circuit via the data node.

6. The system according to claim 1, wherein the sampler includes an analog to digital converter configured to capture digital information indicative of the first and second voltages on the data node.

7. The system according to claim 6, further comprising a memory for storing the digital information indicative of the first and second voltages, the digital information being stored in a lookup table that associates the first and second voltages with the first and second currents to thereby characterize the voltage versus current relationship of the at least one pixel circuit.

8. The system according to claim 1, wherein the controller is further configured to instruct the voltage driver to set the programming voltage for the at least one pixel circuit by adding the voltage corresponding to the zero current level to a voltage indicated by the display data.

9. The system according to claim 1, wherein the at least one pixel circuit is a plurality of pixel circuits arranged in an array of rows and columns, each of the plurality of pixel circuits having a data node coupled to a data line, and wherein the programmable current source is configured to generate a plurality currents to apply to each of the plurality of pixel circuits and the sampler is configured to read a corresponding plurality of voltages for each of the plurality of pixel circuits while each of the plurality of currents is maintained through respective ones of the plurality of pixel circuits.

10. The system according to claim 1, wherein the controller is configured to extract the threshold voltage of the driving transistor of the at least one pixel circuit by extending the voltage versus current relationship for the at least one pixel circuit to the zero current level and determining the voltage corresponding to the zero current level, the voltage corresponding to the zero current level providing an estimate of the threshold voltage of the driving transistor of the at least one pixel circuit.

11. The system according to claim 1, further comprising a memory communicatively coupled to the controller for digitally storing digital information indicative of the first and second voltages.

12. The system according to claim 1, wherein the at least one pixel circuit includes an organic light emitting diode for emitting light according to the display data and one or more thin film transistors for conveying a current through the organic light emitting diode according to the display data.

13. A method of operating a display having at least one pixel circuit, the at least one pixel circuit having a light emitting device coupled in series with a driving transistor configured to convey a driving current through the light emitting device according to display information, the at least one pixel circuit configured to be alternately programmed according to the display information by a programming current applied to a data node of the at least one pixel circuit or by a programming voltage applied to the data node, the method comprising:

applying a first current to the data node of the at least one pixel circuit;

reading a first voltage on the data node while the first current is maintained through the at least one pixel circuit;

applying a second current to the data node of the at least one pixel circuit;

reading a second voltage on the data node while the second current is maintained through the at least one pixel circuit;

storing digital information indicative of the first and second voltages such that the first and second voltages are associated with the first and second currents;

generating a voltage versus current relationship for the at least one pixel circuit based on the first and second voltages and the first and second currents;

extracting, based on the generated voltage versus current relationship for the at least one pixel circuit, a voltage corresponding to a zero current level; and programming the at least one pixel circuit by applying, to the data node of the at least one pixel circuit, a programming voltage that is based on the display data and the voltage corresponding to the zero current level.

14. The method according to claim 13, wherein the at least one pixel circuit is at least one of a plurality of pixel circuits arranged in an array of rows and columns in the display, and wherein the applying the first and second current, the reading the first and second voltages, the storing, the generating, and the extracting are applied to each of the plurality of pixel circuits such that voltages corresponding to the zero current level are extracted for each of the plurality of pixel circuits.

15. The method according to claim 14, wherein the voltage corresponding to the zero current level is an estimate of a threshold voltage of the driving transistor in the at least one pixel circuit, and wherein the programming is applied to each of the plurality of pixel circuits based on the display data for each of the plurality of pixel circuits and based on the estimate of the threshold voltage of the driving transistor for each of the plurality of pixel circuits such that the display is operated to compensate for the threshold voltages of the driving transistors in each of the plurality of pixel circuits.

16. The method according to claim 13, wherein the storing is carried out by digitally storing the digital information indicative of the first and second voltages in a lookup table associated with the at least one pixel circuit.

17. The method according to claim 13, wherein the applying the first current and the applying the second current are performed during a calibration mode of the display that is distinct from a normal display mode, the calibration mode being a period during which images are not shown on the display.

18. The method according to claim 13, wherein at least one of the first current or the second current is a programming current applied to the at least one pixel circuit during a programming operation of a normal display mode to program the at least one pixel circuit to emit light according to the display information.

19. The method according to claim 13, wherein the at least one pixel circuit is at least one of a plurality of pixel circuits arranged in an array of rows and columns in the display, and wherein at least one of the first current or the second current is a programming current applied to the at least one pixel circuit during a programming operation of a normal display mode while others of the plurality of pixel circuits are voltage programmed with programming voltages, thereby hiding the applying the at least one of the first current or the second current to the at least one pixel circuit.

20. The method according to claim 13, further comprising:

responsive to the extracting, applying a third current to the data node of the at least one pixel circuit;

reading a third voltage on the data node while the third current is maintained through the at least one pixel circuit;

storing digital information indicative of the third voltage such that the third voltage is associated with the third current;

updating the voltage versus current relationship for the at least one pixel circuit based on at least the third voltage and the third current;

extracting, based on the updated voltage versus current relationship for the at least one pixel circuit, a voltage corresponding to a zero current level, the voltage corresponding to the zero current level being an updated estimate of a threshold voltage of the driving transistor in the at least one pixel circuit; and programming the at least one pixel circuit to compensate for the threshold voltage of the driving transistor by applying, to the data node of the at least one pixel circuit, a programming voltage that is based on the display data and the updated estimated threshold voltage.

21. A system for programming at least one pixel circuit in a display, the system comprising:

a voltage driver for generating a voltage to apply to a data node of the at least one pixel circuit to thereby program the at least one pixel circuit according to the generated voltage;

a programmable current source for providing a first current to apply to the data node of the at least one pixel circuit;

a sampler for reading a first voltage on the data node while the first current is maintained through the at least one pixel circuit via the programmable current source; and a controller configured to:

receive calibration data indicative of a voltage versus current relationship for the at least one pixel circuit;

generate an updated voltage versus current relationship for the at least one pixel circuit based on the first current and the first voltage and based on the received calibration data, extract, based on the updated voltage versus current relationship for the at least one pixel circuit, a voltage corresponding to a zero current level, and program the at least one pixel circuit via the data node with a programming voltage generated by the voltage driver that is set according to display data and according to the extracted voltage corresponding to the zero current level.

22. The system according to claim 21, wherein the first current is a programming current applied to the at least one pixel circuit during a programming operation of a normal display mode to program the at least one pixel circuit to emit light according to the display information.

23. The system according to claim 21, wherein the at least one pixel circuit is configured to be alternately programmed by a programming current applied to the data node or by a programming voltage applied to the data node.

24. The system according to claim 21, wherein the at least one pixel circuit is a plurality of pixel circuits arranged in an array of rows and columns, each of the plurality of pixel circuits having a data node coupled to a data line, and wherein the programmable current source is configured to generate a plurality currents to apply to each of the plurality of pixel circuits and the sampler is configured to read a corresponding plurality of voltages for each of the plurality of pixel circuits while each of the plurality of currents is maintained through respective ones of the plurality of pixel circuits.

25. The system according to claim 21, wherein the sampler includes an analog to digital converter configured to capture digital information indicative of the first and second voltages on the data node.

26. The system according to claim 25, further comprising a memory for storing the digital information indicative of the first voltage, the digital information being stored in a lookup table that associates the first voltage with the first current to thereby characterize the voltage versus current relationship of the at least one pixel circuit.

27. The system according to claim 21, wherein the at least one pixel circuit includes an organic light emitting diode for emitting light according to the display data and one or more thin film transistors for conveying a current through the organic light emitting diode according to the display data.

28. A method of operating a display having at least one pixel circuit, the at least one pixel circuit having a light emitting device coupled in series with a driving transistor configured to convey a driving current through the light emitting device according to display information, the at least one pixel circuit configured to be alternately programmed according to the display information by a programming current applied to a data node of the at least one pixel circuit or by a programming voltage applied to the data node, the method comprising:

applying a first current to the data node of the at least one pixel circuit;

reading a first voltage on the data node while the first current is maintained through the at least one pixel circuit;

storing digital information indicative of the first voltage such that the first voltage is associated with the first current;

receiving calibration data indicative of a voltage versus current relationship for the at least one pixel circuit;

generating an updated voltage versus current relationship for the at least one pixel circuit based on the first voltage, the first current, and the received calibration data;

extracting, based on the updated voltage versus current relationship for the at least one pixel circuit, a voltage corresponding to a zero current level; and programming the at least one pixel circuit by applying, to the data node of the at least one pixel circuit, a programming voltage that is based on the display data and the voltage corresponding to the zero current level.

29. The method according to claim 28, wherein the at least one pixel circuit is at least one of a plurality of pixel circuits arranged in an array of rows and columns in the display, and wherein the applying the first current, the reading the first voltage, the storing, the receiving, the generating, and the extracting are applied to each of the plurality of pixel circuits such that voltages corresponding to the zero current level are extracted for each of the plurality of pixel circuits.

30. The method according to claim 29, wherein the voltage corresponding to the zero current level is an estimate of a threshold voltage of the driving transistor in the at least one pixel circuit, and wherein the programming is applied to each of the plurality of pixel circuits based on the display data for each of the plurality of pixel circuits and based on the estimate of the threshold voltage of the driving transistor for each of the plurality of pixel circuits such that the display is operated to compensate for the threshold voltages of the driving transistors in each of the plurality of pixel circuits.

*31. A method of adjusting a programming value for a pixel circuit in an OLED display to compensate for degradation of the display or for non-uniformity and degradation of the display, the method comprising:*

*applying a charge to the pixel circuit to acquire threshold voltage information or a shift in threshold voltage information from the pixel circuit;*

*responsive to applying the charge, measuring a voltage of the pixel circuit;*

*extracting from the measured voltage a degradation of the pixel circuit, the degradation adversely affecting a programmed brightness of an OLED in the pixel circuit;*

*digitizing the extracted degradation of the pixel circuit to a digital compensation value representing the degradation of the pixel circuit; and*

*adjusting a video input signal to the pixel circuit based on the digital compensation value to compensate for the degradation of the pixel circuit, wherein the extracting the degradation includes extracting a threshold voltage or a shift in the threshold voltage of a drive transistor in the pixel circuit.*

*32. The method of claim 31, wherein the extracting the degradation includes measuring a rate of discharge of a voltage on the data node of the pixel circuit.*

*33. The method of claim 31, wherein the digitizing the extracted degradation includes:*

*storing digital data corresponding to the digitized extracted degradation in a memory;*

*adding the digital data to the programming value to produce a resulting voltage; and*

*converting the resulting voltage to a corresponding analog value to be applied as the video input signal during a programming phase.*

*34. The method of claim 31, wherein the adjusted video signal input is applied to the pixel circuit during the programming phase as a current or a voltage.*

*35. The method of claim 31, further comprising:*

*generating a voltage versus current relationship for the pixel circuit based on current values applied to a data node of the pixel circuit and based on voltages sampled at the data node; and*

*extracting, based on the generated voltage versus current relationship, a voltage corresponding to a zero current level,*

*wherein the digital compensation value is further adjusted based on the extracted voltage.*

*36. A method of adjusting a programming value for a pixel circuit in an OLED display to compensate for degradation or non-uniformity of the display or for non-uniformity and degradation of the display, the method comprising:*

*applying a current to a node of a pixel circuit;*

*responsive to the applying, acquiring a voltage from the node;*

*creating, from the acquired voltage, a compensation value;*

*storing the compensation value in a memory device; and*

*correcting a video input signal applied to the pixel circuit based on the stored compensation value, wherein the compensation value is indicative of a threshold voltage or a shift in the threshold voltage of a drive transistor in the pixel circuit.*

*37. The method of claim 36, wherein the node is a data node.*

*38. The method of claim 36, wherein the voltage acquired from the data node corresponds to the threshold voltage or the shift in the threshold voltage of a drive transistor in the pixel circuit.*

*39. The method of claim 36, wherein the creating the compensation value includes:*

*storing digital data corresponding to the compensation value in a memory;*

*adding the digital data to the programming value to produce a resulting voltage; and*

*converting the resulting voltage to a corresponding analog value to be applied as the video input signal during a programming phase.*

*40. The method of claim 36, wherein the corrected video signal input is applied to the pixel circuit during the programming phase as a current or a voltage.*

*41. A system for driving a display panel including a pixel circuit having a plurality of transistors and an organic light emitting device, the system comprising:*

*a driver for generating a programming voltage or current to program the pixel circuit through a data line coupled to the pixel circuit;*

*a switching network connected to the display panel;*

*a measurement unit connected to the switching network and shared among multiple columns of the display panel, the measurement unit converting an analog measurement from a data node of corresponding pixel circuits in the multiple columns to a digitalized value; and*

*a memory device configured to store the digital values converted by the measurement unit.*

*42. The method of claim 41, wherein the measurement unit includes an analog-to-digital converter.*

*43. A method of extracting different parameters from a pixel circuit in a display panel, comprising:*

*extracting, using a first measurement implementation, from the pixel circuit a first parameter indicative of a degradation or non-uniformity of the pixel circuit;*

*extracting, using a second measurement implementation different from the first measurement implementation, from the pixel circuit a second parameter indicative of the same or a different degradation or non-uniformity of the pixel circuit as the first extracted parameter; and*

*driving the pixel circuit with programming information that is adjusted based on the extracted first parameter or the extracted second parameter or both, wherein the first parameter is related to a threshold voltage of a drive transistor in the pixel circuit.*

*44. The method of claim 43, wherein the second parameter is a current through a common electrode of an organic light emitting device in the pixel circuit, wherein the common electrode is connected to all of the organic light emitting devices in the display panel.*

*45. A method of adjusting a programming value for a pixel circuit in an OLED display to compensate for degradation of the display or for non-uniformity and degradation of the display, the method comprising:*

*applying a charge to the pixel circuit to acquire threshold voltage information or a shift in threshold voltage information from the pixel circuit;*

*responsive to applying the charge, measuring a voltage of the pixel circuit;*

*extracting from the measured voltage a degradation of the pixel circuit, the degradation adversely affecting a programmed brightness of an OLED in the pixel circuit;*

*digitizing the extracted degradation of the pixel circuit to a digital compensation value representing the degradation of the pixel circuit; and*

*adjusting a video input signal to the pixel circuit based on the digital compensation value to compensate for the degradation of the pixel circuit, wherein the extracting the degradation includes measuring a voltage remaining on a data node of the pixel circuit during a threshold voltage acquisition.*

*46. The method of claim 45, wherein the voltage remaining on the data node corresponds to a threshold voltage or a shift in the threshold voltage of a drive transistor in the pixel circuit.*

*47. The method of claim 45, wherein the digitizing the extracted degradation includes:*

*storing digital data corresponding to the digitized extracted degradation in a memory;*

*adding the digital data to the programming value to produce a resulting voltage; and*

*converting the resulting voltage to a corresponding analog value to be applied as the video input signal during a programming phase.*

*48. The method of claim 45, wherein the adjusted video signal input is applied to the pixel circuit during the programming phase as a current or a voltage.*

*49. A method of adjusting a programming value for a pixel circuit in an OLED display to compensate for degradation of the display or for non-uniformity and degradation of the display, the method comprising:*

*applying a charge to the pixel circuit to acquire threshold voltage information or a shift in threshold voltage information from the pixel circuit;*

*responsive to applying the charge, measuring a voltage of the pixel circuit;*

*extracting from the measured voltage a degradation of the pixel circuit, the degradation adversely affecting a programmed brightness of an OLED in the pixel circuit;*

*digitizing the extracted degradation of the pixel circuit to a digital compensation value representing the degradation of the pixel circuit; and*

*adjusting a video input signal to the pixel circuit based on the digital compensation value to compensate for the degradation of the pixel circuit, wherein the extracting the degradation includes measuring a rate of discharge of a voltage on the data node of the pixel circuit.*

*50. The method of claim 49, wherein the digitizing the extracted degradation includes:*

*storing digital data corresponding to the digitized extracted degradation in a memory;*

*adding the digital data to the programming value to produce a resulting voltage; and*

*converting the resulting voltage to a corresponding analog value to be applied as the video input signal during a programming phase.*

*51. The method of claim 49, wherein the adjusted video signal input is applied to the pixel circuit during the programming phase as a current or a voltage.*

*52. A method of adjusting a programming value for a pixel circuit in an OLED display to compensate for degradation of the display or for non-uniformity and degradation of the display, the method comprising:*

*applying a charge to the pixel circuit to acquire threshold voltage information or a shift in threshold voltage information from the pixel circuit;*

*responsive to applying the charge, measuring a voltage of the pixel circuit;*

*extracting from the measured voltage a degradation of the pixel circuit, the degradation adversely affecting a programmed brightness of an OLED in the pixel circuit;*

*digitizing the extracted degradation of the pixel circuit to a digital compensation value representing the degradation of the pixel circuit; and*

*adjusting a video input signal to the pixel circuit based on the digital compensation value to compensate for the degradation of the pixel circuit,*

*wherein the digitizing the extracted degradation includes:*

*storing digital data corresponding to the digitized extracted degradation in a memory;*

*adding the digital data to the programming value to produce a resulting voltage; and*

*converting the resulting voltage to a corresponding analog value to be applied as the video input signal during a programming phase.*

*53. The method of claim 52, wherein the extracting the degradation includes extracting a threshold voltage or a shift in the threshold voltage of a drive transistor in the pixel circuit.*

*54. The method of claim 52, wherein the extracting the degradation includes measuring a voltage remaining on a data node of the pixel circuit during a threshold voltage acquisition.*

*55. The method of claim 54, wherein the voltage remaining on the data node corresponds to a threshold voltage or a shift in the threshold voltage of a drive transistor in the pixel circuit.*

*56. The method of claim 52, wherein the extracting the degradation includes measuring a rate of discharge of a voltage on the data node of the pixel circuit.*

*57. A method of adjusting a programming value for a pixel circuit in an OLED display to compensate for degradation of the display or for non-uniformity and degradation of the display, the method comprising:*

*applying a charge to the pixel circuit to acquire threshold voltage information or a shift in threshold voltage information from the pixel circuit;*

*responsive to applying the charge, measuring a voltage of the pixel circuit;*

*extracting from the measured voltage a degradation of the pixel circuit, the degradation adversely affecting a programmed brightness of an OLED in the pixel circuit;*

*digitizing the extracted degradation of the pixel circuit to a digital compensation value representing the degradation of the pixel circuit; and*

*adjusting a video input signal to the pixel circuit based on the digital compensation value to compensate for the degradation of the pixel circuit, wherein the adjusted video signal input is applied to the pixel circuit during a programming phase as a current or a voltage.*

*58. The method of claim 57, wherein the extracting the degradation includes extracting a threshold voltage or a shift in the threshold voltage of a drive transistor in the pixel circuit.*

*59. The method of claim 57, wherein the extracting the degradation includes measuring a voltage remaining on a data node of the pixel circuit during a threshold voltage acquisition.*

*60. The method of claim 59, wherein the voltage remaining on the data node corresponds to a threshold voltage or a shift in the threshold voltage of a drive transistor in the pixel circuit.*

*61. The method of claim 57, wherein the extracting the degradation includes measuring a rate of discharge of a voltage on the data node of the pixel circuit.*

*62. The method of claim 57, wherein the digitizing the extracted degradation includes:*

*storing digital data corresponding to the digitized extracted degradation in a memory;*

*adding the digital data to the programming value to produce a resulting voltage; and*

*converting the resulting voltage to a corresponding analog value to be applied as the video input signal during a programming phase.*

*63. The method of claim 57, further comprising:*

*generating a voltage versus current relationship for the pixel circuit based on current values applied to a data node of the pixel circuit and based on voltages sampled at the data node; and*

*extracting, based on the generated voltage versus current relationship, a voltage corresponding to a zero current level,*

*wherein the digital compensation value is further adjusted based on the extracted voltage.*

*64. A method of adjusting a programming value for a pixel circuit in an OLED display to compensate for degradation or non-uniformity of the display or for non-uniformity and degradation of the display, the method comprising:*

*applying a current to a node of a pixel circuit;*

*responsive to the applying, acquiring a voltage from the node;*

*creating, from the acquired voltage, a compensation value;*

*storing the compensation value in a memory device; and*

*correcting a video input signal applied to the pixel circuit based on the stored compensation value, wherein the voltage acquired from the data node corresponds to a threshold voltage or a shift in the threshold voltage of a drive transistor in the pixel circuit.*

*65. The method of claim 64, wherein the node is a data node.*

*66. The method of claim 64, wherein the creating the compensation value includes:*

*storing digital data corresponding to the compensation value in a memory;*

*adding the digital data to the programming value to produce a resulting voltage; and*

*converting the resulting voltage to a corresponding analog value to be applied as the video input signal during a programming phase.*

*67. The method of claim 64, wherein the corrected video signal input is applied to the pixel circuit during a programming phase as a current or a voltage.*

*68. A method of extracting different parameters from a pixel circuit in a display panel, comprising:*

*extracting, using a first measurement implementation, from the pixel circuit a first parameter indicative of a degradation or non-uniformity of the pixel circuit;*

*extracting, using a second measurement implementation different from the first measurement implementation, from the pixel circuit a second parameter indicative of the same or a different degradation or non-uniformity of the pixel circuit as the first extracted parameter; and*

*driving the pixel circuit with programming information that is adjusted based on the extracted first parameter or the extracted second parameter or both, wherein the second parameter is a current through a common electrode of an organic light emitting device in the pixel circuit, wherein the common electrode is connected to all of the organic light emitting devices in the display panel.*

*69. The method of claim 84, wherein the first parameter is related to a threshold voltage of a drive transistor in the pixel circuit.*

*70. A method of adjusting a programming value for a pixel circuit in an OLED display to compensate for degradation of the display or for non-uniformity and degradation of the display, the method comprising:*

*applying a charge to the pixel circuit to acquire threshold voltage information or a shift in threshold voltage information from the pixel circuit;*

*responsive to applying the charge, measuring a voltage of the pixel circuit;*

*extracting from the measured voltage a degradation of the pixel circuit, the degradation adversely affecting a programmed brightness of an OLED in the pixel circuit;*

*digitizing the extracted degradation of the pixel circuit to a digital compensation value representing the degradation of the pixel circuit;*

*adjusting a video input signal to the pixel circuit based on the digital compensation value to compensate for the degradation of the pixel circuit;*

*generating a voltage versus current relationship for the pixel circuit based on current values applied to a data node of the pixel circuit and based on voltages sampled at the data node; and*

*extracting, based on the generated voltage versus current relationship, a voltage corresponding to a zero current level,*

*wherein the digital compensation value is further adjusted based on the extracted voltage.*

* * * * *